US011447649B2

(12) United States Patent
Ikeda et al.

(10) Patent No.: US 11,447,649 B2
(45) Date of Patent: Sep. 20, 2022

(54) AQUEOUS INK JET COMPOSITION

(71) Applicant: Seiko Epson Corporation, Tokyo (JP)

(72) Inventors: Yasunari Ikeda, Shiojiri (JP); Hiroko Hayashi, Shiojiri (JP); Kenji Kitada, Shiojiri (JP); Hirofumi Hokari, Chino (JP); Hisashi Okamura, Shiojiri (JP); Kenta Kikuchi, Suwa (JP); Shinichi Naito, Chino (JP)

(73) Assignee: Seiko Epson Corporation (*) Notice: Subject to any disclaimer, the term of this patent is extended or adjusted under 35 U.S.C. 154(b) by 613 days.

(21) Appl. No.: 16/411,332

(22) Filed: May 14, 2019

(65) Prior Publication Data

US 2019/0352525 A1 Nov. 21, 2019

(30) Foreign Application Priority Data

May 15, 2018 (JP) .............................. JP2018-093929
Jun. 4, 2018 (JP) .............................. JP2018-106972

(51) Int. Cl.
C09D 11/328 (2014.01)
C09D 11/38 (2014.01)

(52) U.S. Cl.
CPC ............ C09D 11/328 (2013.01); C09D 11/38 (2013.01)

(58) Field of Classification Search
CPC .. C09D 11/307; C09D 11/326; C09B 67/0033
See application file for complete search history.

(56) References Cited

U.S. PATENT DOCUMENTS

| 2005/0279248 | A1 | 12/2005 | Auslander |
| 2008/0070009 | A1 | 3/2008 | Akatani et al. |
| 2015/0275012 | A1* | 10/2015 | Ikeda .................. C09D 11/326 106/31.13 |
| 2016/0075879 | A1* | 3/2016 | Ikeda .................. C09B 67/0033 8/641 |
| 2017/0218203 | A1* | 8/2017 | Harada ................ C09D 11/037 |

FOREIGN PATENT DOCUMENTS

| CN | 104 497 708 A | 4/2015 |
| CN | 107 418 249 A | 12/2017 |
| JP | 2008266466 A * | 11/2008 ............. C09D 11/00 |
| JP | 2016-190932 A | 11/2016 |
| WO | WO-96-031565 A1 | 10/1996 |
| WO | WO-2005-121263 A1 | 12/2005 |

OTHER PUBLICATIONS

Extended European Search Report for Application No. EP 19 17 4560 dated Aug. 22, 2019 (5 pages).

* cited by examiner

Primary Examiner — Khanh T Nguyen
(74) Attorney, Agent, or Firm — Harness, Dickey & Pierce, P.L.C.

(57) ABSTRACT

An aqueous ink jet composition includes a first component which is at least one selected from the group consisting of C.I. Solvent Yellow 160: 1, C.I. Disperse Yellow 82, and C.I. Disperse Yellow 184; a second component which is a dispersant having at least one chemical structure of a sulfo group and a salt thereof; and a third component which has a coumarin skeleton and at least one chemical structure of a sulfo group and a salt thereof.

17 Claims, No Drawings

AQUEOUS INK JET COMPOSITION

The present application is based on and claims priority from JP Application Serial Number 2018-093929, filed May 15, 2018, and JP Application Serial Number 2018-106972, filed Jun. 4, 2018, the disclosures of which are hereby incorporated by reference herein in their entirety.

BACKGROUND

1. Technical Field

The present disclosure relates to an aqueous ink jet composition.

2. Related Art

In recent years, the application of ink jet printers has been increasingly expanded not only to office and household printing machines but also to commercial printing, textile printing, and the like.

In addition, an ink jet ink containing a fluorescent dye has also been increasingly used.

As a fluorescent dye having an excellent fluorescence intensity, for example, there may be mentioned C.I. Solvent Yellow 160: 1, C.I. Disperse Yellow 82, and C.I. Disperse Yellow 184.

However, when those fluorescent dyes are each used for an ink jet ink, compared to other colorants, there have been problems in that storage stability of the ink jet ink is inferior and in that foreign materials are liable to be generated therein.

In order to improve dispersibility of the above fluorescent dye, there has been proposed an ink containing an anion-based dispersant and a compound formed from at least one selected from the group consisting of an ethylene oxide adduct of phytosterol, an ethylene oxide adduct of hydrogenated phytosterol, an ethylene oxide adduct of cholestanol, and an ethylene oxide adduct of hydrogenated cholestanol (for example, see International Publication No. WO 2005/121263).

However, when an ink jet ink containing the fluorescent dye described above is stored for a long period of time and/or is placed in an environment in which a thermal stress is liable to be applied, problems, such as increase in particle diameter, increase in viscosity, and generation of foreign materials, cannot be sufficiently suppressed, and as a result, an ejection defect of the ink jet ink due to clogging of a head filter and/or a nozzle is liable to occur.

In order to solve the problems described above, as a dispersant which improves the dispersibility of the fluorescent dye as described above, the use of a dispersant having a relatively high hydrophobic property may be conceived. However, since the dispersant as described above naturally has a low water solubility, when the ink jet ink is placed in a state so as to be easily dried, such as in a state of nozzle idle running or long-term storage, in particular, a solid component of the ink jet ink is liable to be precipitated. When the solid component is precipitated once, a head filter and/or a nozzle is clogged, and as a result, the ejection defect of the ink jet ink occurs.

In order to suppress precipitation of the solid component of the ink jet ink caused by the drying as described above and the generation of the defect caused thereby, although a dispersant having a low hydrophobic property, such as a dispersant having a sulfo group, can be effectively used, in this case, the storage stability of the ink jet ink as described above is more liable to be degraded.

That is, in an ink jet ink containing the fluorescent dye as described above, it has been difficult to simultaneously achieve storage stability and clogging resistance by which clogging of a head filter and/or a nozzle caused by drying is not likely to occur.

SUMMARY

The present disclosure can be realized by the following application examples.

An aqueous ink jet composition according to a first application example of the present disclosure comprises: a first component which is at least one selected from the group consisting of C.I. Solvent Yellow 160: 1, C.I. Disperse Yellow 82, and C.I. Disperse Yellow 184; a second component which is a dispersant having at least one chemical structure of a sulfo group and a salt thereof; and a third component which has a coumarin skeleton and at least one chemical structure of a sulfo group and a salt thereof.

In addition, in the aqueous ink jet composition according to the first application example of the present disclosure, the second component may be at least one selected from the group consisting of a formalin condensate of sodium naphthalene sulfonate, sodium lignin sulfonate, and a styrene-sodium styrene sulfonate copolymer.

In addition, in the aqueous ink jet composition according to the first application example of the present disclosure, the third component may be at least one selected from the group consisting of C.I. Acid Yellow 184 and C.I. Acid Yellow 250.

In addition, in the aqueous ink jet composition according to the first application example of the present disclosure, when the content of the first component and the content of the second component are represented by X1 percent by mass and X2 percent by mass, respectively, $0.2 \leq X2/X1 \leq 5.0$ may be satisfied.

In addition, in the aqueous ink jet composition according to the first application example of the present disclosure, when the content of the first component and the content of the third component are represented by X1 percent by mass and X3 percent by mass, respectively, $0.001 \leq X3/X1 \leq 3.0$ may be satisfied.

In addition, in the aqueous ink jet composition according to the first application example of the present disclosure, when the content of the second component and the content of the third component are represented by X2 percent by mass and X3 percent by mass, respectively, $0.001 \leq X3/X2 \leq 3.0$ may be satisfied.

In addition, in the aqueous ink jet composition according to the first application example of the present disclosure, the content of the first component may be 0.5 to 20 percent by mass.

In addition, in the aqueous ink jet composition according to the first application example of the present disclosure, the content of the second component may be 0.5 to 20 percent by mass.

In addition, in the aqueous ink jet composition according to the first application example of the present disclosure, the content of the third component may be 0.005 to 6.0 percent by mass.

An aqueous ink jet composition according to a second application example of the present disclosure comprises: at least two types of dye components selected from a specific yellow dye group consisting of C.I. Solvent Yellow 160: 1, C.I. Disperse Yellow 82, and C.I. Disperse Yellow 184; and a sulfonic acid-based dispersant which is a dispersant having at least one chemical structure of a sulfo group and a salt thereof.

In addition, in the aqueous ink jet composition according to the second application example of the present disclosure, when one component having the highest content among the dye components forming the specific yellow dye group is regarded as a first dye component, the content of the first dye component with respect to the entire specific yellow dye group may be 50.0 to 99.9 percent by mass.

In addition, in the aqueous ink jet composition according to the second application example of the present disclosure, when one component having the highest content among the dye components forming the specific yellow dye group is regarded as a first dye component, another component among the dye components forming the specific yellow dye group, the content of which is the same as or second to the content of the first dye component, is regarded as a second dye component, the content of the first dye component in the aqueous ink jet composition is represented by X1 percent by mass, and the content of the second dye component in the aqueous ink jet composition is represented by X2 percent by mass, $0.001 \leq X2/X1 \leq 1.0$ may be satisfied.

In addition, in the aqueous ink jet composition according to the second application example of the present disclosure, the component having the highest content among the dye components forming the specific yellow dye group may be C.I. Solvent Yellow 160: 1.

In addition, in the aqueous ink jet composition according to the second application example of the present disclosure, the sulfonic acid-based dispersant may be at least one selected from the group consisting of a formalin condensate of sodium naphthalene sulfonate, sodium lignin sulfonate, and a styrene-sodium styrene sulfonate copolymer.

In addition, in the aqueous ink jet composition according to the second application example of the present disclosure, when the content of the specific yellow dye group and the content of the sulfonic acid-based dispersant are represented by XD percent by mass and XS percent by mass, respectively, $0.2 \leq XS/XD \leq 5.0$ may be satisfied.

In addition, in the aqueous ink jet composition according to the second application example of the present disclosure, the content of the specific yellow dye group may be 0.6 to 26 percent by mass.

In addition, in the aqueous ink jet composition according to the second application example of the present disclosure, the component having the highest content among the dye components forming the specific yellow dye group may be C.I. Solvent Yellow 160: 1, the content of C.I. Solvent Yellow 160: 1 with respect to the entire specific yellow dye group may be 60.0 to 99.0 percent by mass, and the content of C.I. Solvent Yellow 160: 1 in the aqueous ink jet composition may be 0.5 to 25.0 percent by mass.

In addition, in the aqueous ink jet composition according to the second application example of the present disclosure, the content of the sulfonic acid-based dispersant may be 0.5 to 20 percent by mass.

DESCRIPTION OF EXEMPLARY EMBODIMENTS

Hereinafter, a preferable first embodiment of the present disclosure will be described in detail.
Aqueous Ink Jet Composition Among various types of fluorescent dyes, although C.I. Solvent Yellow 160: 1, C.I. Disperse Yellow 82, and C.I. Disperse Yellow 184 have features, such as excellent fluorescence intensity, they also have the following problem. That is, when the above fluorescent dyes were each used as a constituent component of an aqueous ink jet composition in the past, it was difficult to simultaneously achieve storage stability of the aqueous ink jet composition and clogging resistance by which clogging of a head filter and/or a nozzle caused by drying is not likely to occur.

Accordingly, in order to simultaneously achieve the storage stability of the aqueous ink jet composition containing the fluorescent dye as described above and the clogging resistance by which clogging of a head filter and/or a nozzle caused by drying is not likely to occur while the excellent features of the above fluorescent dye are appropriately utilized, intensive research was carried out by the present inventor, and as a result, the present disclosure was made.

That is, the aqueous ink jet composition of the present disclosure comprises a first component which is at least one selected from the group consisting of C.I. Solvent Yellow 160: 1, C.I. Disperse Yellow 82, and C.I. Disperse Yellow 184, a second component which is a dispersant having at least one chemical structure of a sulfo group and a salt thereof, and a third component which has a coumarin skeleton and at least one chemical structure of a sulfo group and a salt thereof.

According to the structure as described above, while excellent features of the first component are obtained, an aqueous ink jet composition capable of simultaneously achieving the storage stability and the clogging resistance by which clogging of a head filter and/or a nozzle caused by drying is not likely to occur can be provided.

The reasons the excellent advantage as described above can be obtained are believed as described below. That is, since the second component functioning as a sulfonic acid-based dispersant having at least one chemical structure of a highly hydrophilic sulfo group and salt thereof is used, the aqueous ink jet composition can be effectively suppressed from being dried at a nozzle or the like, and in addition, since the third component having a coumarin skeleton, which is the same chemical structure as that of the first component, and a $SO_3^-$, which is the same chemical structure as that of the second component, is contained, dispersion stability of the first component can be improved.

On the other hand, when the conditions as described above are not satisfied, a satisfactory result cannot be obtained.

For example, when another fluorescent dye is used instead of the first component described above, at a recorded portion formed by using an aqueous ink jet composition, a sufficient fluorescence intensity is difficult to obtain. In addition, in this specification, the "recorded portion" is the concept including, besides a portion of a recording medium to which an aqueous ink jet composition is applied by an ink jet method, a portion to which a constituent component of an aqueous ink jet composition is transferred when the aqueous ink jet composition is applied to a thermal transfer printing method, such as sublimation printing.

In addition, when the second component is not used, it becomes difficult to sufficiently improve the dispersion stability of the aqueous ink jet composition, and foreign materials may be liable to be generated in the aqueous ink jet composition during its storage.

In addition, instead of the second component, when a dispersant other than the sulfonic acid-based dispersant is used, that is, for example, a dispersant having a highly hydrophobic functional group, such as a carboxyl group, as compared to a sulfo group, is used, the following defect may occur. That is, for example, when an ink jet ink functioning as the aqueous ink jet composition is placed in a state so as to be easily dried, such as in a state of nozzle idle running or long-term storage, a solid component of the aqueous ink jet composition is liable to be precipitated, and an ejection defect of the aqueous ink jet composition caused, for example, by clogging of a head filter and/or a nozzle may occur.

In addition, when the third component is not used, the storage stability of the aqueous ink jet composition is inferior, and foreign materials are liable to be generated in the aqueous ink jet composition during its storage.

In addition, in this specification, the aqueous ink jet composition is the concept including, besides an ink itself to be ejected by an ink jet method, a raw liquid used for preparation of the ink described above. In other words, the aqueous ink jet composition of the present disclosure may be either a composition to be ejected as it is by an ink jet method or a composition to be ejected by an ink jet method after being processed by dilution or the like.

First Component

The aqueous ink jet composition contains the first component which is at least one selected from the group consisting of C.I. Solvent Yellow 160: 1, C.I. Disperse Yellow 82, and C.I. Disperse Yellow 184.

The first component is a yellow-based fluorescent dye. In addition, the first component is mostly present in a dispersed state in the aqueous ink jet composition.

Among the above three types of dyes, in particular, the first component contained in the aqueous ink jet composition is preferably C.I. Solvent Yellow 160: 1. In particular, the rate of C.I. Solvent Yellow 160: 1 in the first component forming the aqueous ink jet composition is preferably 50 to 100 percent by mass and more preferably 70 to 100 percent by mass.

Accordingly, the fluorescence intensity and the color tone of the recorded portion formed by using the aqueous ink jet composition can be made more preferable.

The average particle diameter of the first component in the aqueous ink jet composition is preferably 50 to 250 nm, more preferably 75 to 200 nm, and further preferably 100 to 150 nm.

Accordingly, the storage stability of the aqueous ink jet composition is further improved. In addition, the recorded portion formed by using the aqueous ink jet composition can be more effectively sublimated, and hence, the aqueous ink jet composition can be more preferably applied to sublimation printing.

In addition, in this specification, the average particle diameter indicates a volume-based average particle diameter unless otherwise particularly noted. The average particle diameter can be obtained, for example, by measurement using a Microtrac UPA (manufactured by Nikkiso Co., Ltd.).

The content of the first component in the aqueous ink jet composition is preferably 0.5 to 20 percent by mass, more preferably 1.0 to 18 percent by mass, and further preferably 2.0 to 15 percent by mass.

Accordingly, a higher color density and a higher fluorescence intensity can be obtained at the recorded portion formed by using the aqueous ink jet composition, and in addition, the storage stability of the aqueous ink jet composition can also be further improved.

In particular, when the aqueous ink jet composition is an ink itself to be ejected by an ink jet method, the content of the first component in the ink is preferably 0.5 to 13 percent by mass, more preferably 1.0 to 12 percent by mass, and further preferably 2.0 to 9.0 percent by mass.

In addition, when the aqueous ink jet composition is a raw liquid used for preparation of an ink to be ejected by an ink jet method, the content of the first component in the raw liquid is preferably 8.0 to 20 percent by mass, more preferably 9.0 to 19 percent by mass, and further preferably 10 to 18 percent by mass.

In addition, when the first component forming the aqueous ink jet composition contains a plurality of compounds, as the content of the first component, the total of the contents of the plurality of compounds is to be used.

Second Component

The aqueous ink jet composition of the present disclosure contains the second component which is a dispersant having at least one chemical structures of a sulfo group and a salt thereof.

When the aqueous ink jet composition is applied to a recording apparatus by an ink jet method, the second component primarily has a function to improve the dispersibility of the first component while effectively preventing precipitation of a solid component of the ink jet ink caused by drying.

Although the second component which is the sulfonic acid-based dispersant is not particularly limited as long as having at least one chemical structure of a sulfo group and a salt thereof, that is, as long as having a structure which generates $—SO_3$ by ionization, at least one selected from the group consisting of a formalin condensate of sodium naphthalene sulfonate, sodium lignin sulfonate, and a styrene-sodium styrene sulfonate copolymer is preferable, and at least one selected from the group consisting of a formalin condensate of sodium naphthalene sulfonate and a styrene-sodium styrene sulfonate copolymer is more preferable. In particular, the total of the rate of the formalin condensate of sodium naphthalene sulfonate and the rate of the styrene-sodium styrene sulfonate copolymer in the entire second component forming the aqueous ink jet composition is preferably 50 to 100 percent by mass and more preferably 70 to 100 percent by mass.

Accordingly, the prevention of the precipitation of the solid component of the ink jet ink caused by drying and the improvement in dispersibility of the first component can be simultaneously achieved at a higher level.

The content of the second component in the aqueous ink jet composition is preferably 0.5 to 20 percent by mass, more preferably 1.0 to 18 percent by mass, and further preferably 2.0 to 15 percent by mass.

Accordingly, the content of the first component and the content of the third component are effectively prevented from being excessively decreased, and while the functions thereof are reliably obtained, the above advantage of the presence of the second component can be more significantly obtained.

In particular, when the aqueous ink jet composition is an ink itself to be ejected by an ink jet method, the content of the second component in the ink is preferably 0.5 to 13 percent by mass, more preferably 1.0 to 12 percent by mass, and further preferably 2.0 to 9.0 percent by mass.

In addition, when the aqueous ink jet composition is a raw liquid used for preparation of an ink to be ejected by an ink jet method, the content of the second component in the raw liquid is preferably 8.0 to 20 percent by mass, more preferably 9.0 to 19 percent by mass, and further preferably 10 to 18 percent by mass.

In addition, when the second component forming the aqueous ink jet composition contains a plurality of compounds, as the content of the second component, the total of the contents of the plurality of compounds is to be used.

Third Component

The aqueous ink jet composition of the present disclosure contains the third component having a coumarin skeleton and at least one chemical structure of a sulfo group and a salt thereof.

Since having a coumarin skeleton which is the chemical structure present in the molecule of the first component and at least one chemical structure of a sulfo group and a salt thereof which is the chemical structure present in the molecule of the second component, the third component has an excellent affinity with the first component and the second component. Since the third component as described above is contained, the storage stability of the aqueous ink jet composition can be improved. In particular, while the function of the first component and the function of the second component are sufficiently obtained, the storage stability of the aqueous ink jet composition can be improved. In addition, the third component described above is a component which is not likely to adversely influence sublimation printing.

Although any material having in its molecule, a coumarin skeleton and at least one chemical structure of a sulfo group and a salt thereof may be used as the third component, the third component is preferably at least one selected from the group consisting of C.I. Acid Yellow 184 and C.I. Acid Yellow 250.

Accordingly, while the function of the first component and the function of the second component as described above are more effectively obtained, the storage stability of the aqueous ink jet composition can be improved.

In addition, C.I. Acid Yellow 184 has a chemical structure represented by the following formula (1), and C.I. Acid Yellow 250 has a chemical structure represented by the following formula (2).

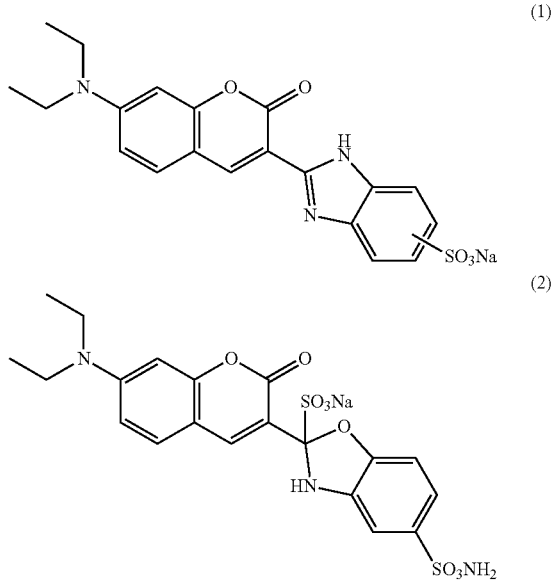

The content of the third component in the aqueous ink jet composition is preferably 0.005 to 6.0 percent by mass, more preferably 0.04 to 5.0 percent by mass, and further preferably 0.3 to 4.0 percent by mass.

Accordingly, the content of the first component and the content of the second component are effectively prevented from being excessively decreased, and while the functions thereof are more reliably obtained, the advantage of the presence of the third component as described above can be significantly obtained.

In particular, when the aqueous ink jet composition is an ink itself to be ejected by an ink jet method, the content of the third component in the ink is preferably 0.005 to 2.5 percent by mass, more preferably 0.04 to 2.0 percent by mass, and further preferably 0.3 to 1.8 percent by mass.

In addition, when the aqueous ink jet composition is a raw liquid used for preparation of an ink to be ejected by an ink jet method, the content of the third component in the raw liquid is preferably 1.0 to 6.0 percent by mass, more preferably 1.5 to 5.0 percent by mass, and further preferably 2.0 to 4.0 percent by mass.

In addition, when the third component forming the aqueous ink jet composition contains a plurality of compounds, as the content of the third component, the total of the contents of the plurality of compounds is to be used.

When the content of the first component and the content of the second component in the aqueous ink jet composition are represented by X1 percent by mass and X2 percent by mass, respectively, $0.2 \leq X2/X1 \leq 5.0$ is preferably satisfied, $0.4 \leq X2/X1 \leq 2.5$ is more preferably satisfied, and $0.5 \leq X2/X1 \leq 2.0$ is further preferably satisfied.

Accordingly, the fluorescence intensity and the color tone of the recorded portion formed by using the aqueous ink jet composition, the effect of preventing the precipitation of the solid component of the ink jet ink caused by drying, the dispersibility of the first component in the ink jet ink, and the like can be further improved.

When the content of the first component and the content of the third component in the aqueous ink jet composition are represented by X1 percent by mass and X3 percent by mass, respectively, $0.001 \leq X3/X1 \leq 3.0$ is preferably satisfied, $0.01 \leq X3/X1 \leq 2.0$ is more preferably satisfied, and $0.1 \leq X3/X1 \leq 1.0$ is further preferably satisfied.

Accordingly, the fluorescence intensity and the color tone of the recorded portion formed by using the aqueous ink jet composition and the storage stability thereof can be simultaneously achieved at a higher level.

When the content of the second component and the content of the third component in the aqueous ink jet composition are represented by X2 percent by mass and X3 percent by mass, respectively, $0.001 \leq X3/X2 \leq 3.0$ is preferably satisfied, $0.01 \leq X3/X2 \leq 2.0$ is more preferably satisfied, and $0.1 \leq X3/X2 \leq 1.0$ is further preferably satisfied.

Accordingly, while the precipitation of the solid component of the ink jet ink caused by drying can be effectively prevented, the storage stability of the aqueous ink jet composition can be further improved.

Water

The aqueous ink jet composition contains water. As this water, purified water, such as RO water, distilled water, or ion-exchanged water, may be used.

Although being not particularly limited, the content of the water in the aqueous ink jet composition is preferably 30 to 85 percent by mass, more preferably 35 to 80 percent by mass, and further preferably 40 to 75 percent by mass.

Accordingly, the viscosity of the aqueous ink jet composition can be more reliably adjusted to a preferable value, and ejection stability by an ink jet method can be further improved.

Solvent Other than Water

The aqueous ink jet composition may contain a solvent other than water.

Accordingly, the viscosity of the aqueous ink jet composition can be preferably adjusted, and a moisture-retaining property of the aqueous ink jet composition can be improved. As a result, liquid droplet ejection by an ink jet method can be more stably performed.

As the solvent contained in the aqueous ink jet composition other than water, for example, there may be mentioned glycerin, propylene glycol, and 2-pyrrolidone.

Since at least one of those solvents is contained, an evaporation rate can be slowed by an excellent moisture-retaining property, and more stable liquid droplet ejection can be performed.

The content of the solvent contained in the aqueous ink jet composition other than water is preferably 0 to 45 percent by mass, more preferably 10 to 43 percent by mass, and further preferably 15 to 40 percent by mass.

Accordingly, the advantage of the presence of the solvent other than water can be more significantly obtained.

Surfactant

The aqueous ink jet composition may contain a surfactant.

Accordingly, wettability of the aqueous ink jet composition to a recording medium (base material) can be made more preferable, and a more preferable image quality can be advantageously obtained.

As the surfactant contained in the aqueous ink jet composition, for example, there may be used various types of surfactants, such as an anionic surfactant, a cationic surfactant, and a nonionic surfactant.

In more particular, as the surfactant contained in the aqueous ink jet composition, for example, there may be mentioned an acetylene-based surfactant, a silicone-based surfactant, and a fluorine-based surfactant.

When the aqueous ink jet composition contains a silicone-based surfactant, the wettability of the aqueous ink jet composition to the recording medium (base material) can be further improved, and a more excellent gradation image (recorded portion) can be formed.

When the aqueous ink jet composition contains a silicone-based surfactant, the content of the silicone-based surfactant in the aqueous ink jet composition with respect to 100 parts by mass of the first component is preferably 5.0 to 150 parts by mass, more preferably 7.0 to 140 parts by mass, and further preferably 10 to 70 parts by mass.

Accordingly, the advantage of the presence of the silicone-based surfactant described above can be more significantly obtained.

As a commercially available silicone-based surfactant, for example, there may be mentioned BYK-306, BYK-307, BYK-333, BYK-337, BYK-341, BYK-345, BYK-346, BYK-347, BYK-348, BYK-349, and BYK-378 (trade names, manufactured by BYK Japan KK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.).

Other Components

The aqueous ink jet composition may contain components (other components) other than the components described above.

As the other components, for example, there may be mentioned a colorant other than those described above; a dispersant other than those described above; a penetrating agent, such as triethylene glycol monomethyl ether, triethylene glycol monobutyl ether, diethylene glycol monomethyl ether, 1,2-hexanediol, 1,2-pentanediol, 1,2-butanediol, or 3-methyl-1,5-pentanediol; a pH adjuster; a chelating agent, such as ethylenediaminetetraacetate (EDTA); an antiseptic agent/fungicide; and an antirust agent. As the antiseptic agent/fungicide, for example, a compound having an intramolecular isothiazolone ring structure may be preferably used.

The content of one of the other components (when a plurality of components is contained as the other components, the total of the contents thereof is to be used) is preferably 6 percent by mass or less and more preferably 4 percent by mass or less.

In particular, when the aqueous ink jet composition of the present disclosure contains a dispersant (another dispersant) other than that described above, the content of the dispersant (the another dispersant) is preferably 5 percent by mass or less and more preferably 3 percent by mass or less.

The surface tension of the aqueous ink jet composition at 20° C. is preferably 20 to 50 mN/m, more preferably 21 to 40 mN/m, and further preferably 23 to 30 mN/m.

Accordingly, for example, clogging of a nozzle of an ejection apparatus by an ink jet method is more unlikely to occur, and the ejection stability of the aqueous ink jet composition is further improved. In addition, even if the nozzle is clogged, a recovery property obtained when the nozzle is capped (capping) can be further improved.

In addition, as the surface tension, a value measured by Wilhelmy method may be used. The measurement of the surface tension may be performed using a surface tension meter (such as CBVP-7, manufactured by Kyowa Interface Science Co., Ltd.).

The viscosity of the aqueous ink jet composition at 20° C. is preferably 2 to 30 mPa·s, more preferably 3 to 20 mPa·s, and further preferably 4 to 10 mPa·s.

Accordingly, the ejection stability of the aqueous ink jet composition is further improved.

In addition, the viscosity can be measured at 20° C. using a viscoelastic tester (such as MCR-300, manufactured by Pysica) in such a way that the shear rate is increased from 10 to 1,000 s$^-$, and a viscosity at a shear rate of 200 s$^-$ is read.

In general, the aqueous ink jet composition of the present disclosure is, first, received in a container, such as a cartridge, a bag, or a tank, and is then applied to a recording apparatus by an ink jet method. In other words, a recording apparatus according to the present disclosure includes a container (such as an ink cartridge) receiving the aqueous ink jet composition of the present disclosure.

The aqueous ink jet composition of the present disclosure may be either an ink to be ejected by an ink jet method or a raw liquid used for preparation of the ink, and although a concrete structure of an apparatus ejecting liquid droplets is not particularly limited, the aqueous ink jet composition (including the raw liquid) of the present disclosure is preferably applied to an air-open type recording apparatus (in more particular, for example, an ink jet recording apparatus including an ink receiving container which has an ink inlet through which an ink can be replenished and a recording head which has at least one nozzle hole through which the ink is ejected).

In the recording apparatus as described above, when an ink containing at least one selected from the group consisting of C.I. Solvent Yellow 160: 1, C.I. Disperse Yellow 82, and C.I. Disperse Yellow 184 is used, since the ink is brought into contact with the air, a problem in that foreign materials are generated at a gas-liquid interface is particularly liable to occur. However, according to the present disclosure, even when the ink described above is applied to the recording apparatus as described above, the above problem can be effectively prevented from being generated. That is, when the aqueous ink jet composition of the present disclosure is applied to an air-open type recording apparatus, the advantage of the present disclosure can be more significantly obtained.

Recording Method

The aqueous ink jet composition of the present disclosure may be applied, for example, to a direct printing method, a thermal transfer printing method (such as sublimation printing), and the like. In particular, since the first component which is a fluorescent dye has a sublimation property, and in addition, the third component which is a colorant component has substantially no sublimation property (in other words, the sublimation property thereof is sufficiently low as compared to that of the first component), while the features, such as excellent color tone and fluorescence intensity, of the first component are obtained, the third component can be effectively prevented from imparting adverse influence to the color tone of a final recorded portion, and hence, the aqueous ink jet composition of the present disclosure can be preferably applied to a thermal transfer printing method.

Hereinafter, as a recording method using the aqueous ink jet composition of the present disclosure, one example of the thermal transfer printing method (sublimation printing) will be described.

A recording method according to the first embodiment includes an ink adhesion step of adhering an aqueous ink jet composition to an intermediate transfer medium by an ink jet method and a transfer step of transferring a first component functioning as a sublimation dye contained in the aqueous ink jet composition to a recording medium by heating the intermediate transfer medium to which the aqueous ink jet composition is adhered.

Ink Adhesion Step

In the ink adhesion step, by an ink jet method, the aqueous ink jet composition is adhered to the intermediate transfer medium. Ejection of the aqueous ink jet composition by an ink jet method can be performed by a known ink jet recording apparatus. As an ejection method, for example, there may be used a piezoelectric method or a method in which an ink is ejected by bubbles generated by heating the ink. In particular, since the aqueous ink jet composition is not likely to be degraded, a piezoelectric method is preferable.

In the ink adhesion step, an ink other than the aqueous ink jet composition according to the present disclosure may also be used together therewith.

Intermediate Transfer Medium

As the intermediate transfer medium, for example, paper, such as regular paper, or a recording medium (called ink jet exclusive paper, coated paper, or the like) on which an ink receiving layer is provided may be used. Among those mentioned above, paper provided with an ink receiving layer formed of inorganic particles, such as silica, is preferable. Accordingly, by a step of drying the aqueous ink jet composition adhered to the intermediate transfer medium, the intermediate transfer medium can be obtained so that, for example, bleeding is suppressed. In addition, in the subsequent transfer step, the sublimation of the first component tends to be more smoothly carried out.

Transfer Step

Subsequently, the intermediate transfer medium to which the aqueous ink jet composition is adhered is heated, so that the first component functioning as a constituent component of the aqueous ink jet composition is transferred to the recording medium. Accordingly, the recorded portion is obtained.

In particular, since the first component functioning as a fluorescent dye has a sublimation property, and the third component functioning as a colorant component has substantially no sublimation property (in other words, the sublimation property is sufficiently low as compared to that of the first component), while the transfer of the third component to the recording medium is effectively prevented, the first component can be transferred to the recording medium. Hence, in the recorded portion thus obtained, while the features, such as excellent color tone and fluorescence intensity, of the first component are obtained, the adverse influence by the color tone of the third component can be effectively prevented.

A heating temperature of this step is preferably 160° C. to 220° C. and more preferably 170° C. to 200° C.

Accordingly, the energy required for the transfer can be decreased, and the productivity of the recorded portion can be improved. In addition, for example, the chromogenic property of the obtained recorded portion can be further improved.

Although depending on the heating temperature, a heating time of this step is preferably 30 to 90 seconds and more preferably 45 to 80 seconds.

Accordingly, the energy required for the transfer can be further decreased, and the productivity of the recorded portion can be further improved. In addition, for example, the chromogenic property of the obtained recorded portion can be further improved.

In addition, although this step may be performed in such a way that heating is performed while the surface of the intermediate transfer medium to which the aqueous ink jet composition is adhered is placed to face the recording medium with a predetermined distance provided therebetween or while the surface of the intermediate transfer medium described above is in close contact with a surface of the recording medium, the heating is preferably performed while the surface of the intermediate transfer medium to which the aqueous ink jet composition is adhered is in close contact with the surface of the recording medium.

Accordingly, the energy required for the transfer can be further decreased, and the productivity of the recorded portion can be further improved. In addition, for example, the chromogenic property of the obtained recorded portion can be further improved.

Recording Medium

Although the recording medium is not particularly limited, for example, a cloth (such as a hydrophobic fiber cloth), a resin (plastic) film, paper, glass, a metal, and a ceramic may be mentioned. In addition, as the recording medium, a medium having a sheet shape or a steric shape, such as a sphere shape or a rectangular parallelepiped shape, may also be used.

When the recording medium is a cloth, as fibers forming the cloth, for example, there may be mentioned polyester fibers, nylon fibers, triacetate fibers, diacetate fibers, polyamide fibers, and a blended product formed from at least two types of the fibers mentioned above. In addition, there may also be used a blended product formed from the fibers mentioned above with regenerated fibers, such as rayon, or natural fibers, such as cotton, silk, or wool.

In addition, when the recording medium is a resin (plastic) film, as the resin (plastic) film, for example, there may be mentioned a polyester film, a polyurethane film, a polycarbonate film, a poly(phenylene sulfide) film, a polyimide film, and a poly(amide imide) film.

In addition, the resin (plastic) film may be either a laminated film formed by laminating a plurality of layers or a film formed of a gradient material in which the composition thereof is gradiently changed.

Heretofore, although the first embodiment of the present disclosure has been described, the present disclosure is not limited thereto.

For example, as the aqueous ink jet composition of the present disclosure, any composition which can be ejected by an ink jet method may be used, and the aqueous ink jet composition of the present disclosure may be not applied to the recording method as described above.

For example, the aqueous ink jet composition of the present disclosure may also be applied to a method including, besides the steps as described above, other steps (a pre-treatment step, an intermediate treatment step, and a post-treatment step).

In this case, as the pre-treatment step, for example, a step of applying a coating layer on the recording medium may be mentioned.

In addition, as the intermediate treatment step, for example, a step of performing pre-heating of the recording medium may be mentioned.

In addition, as the post-treatment step, for example, a step of washing the recording medium may be mentioned.

In addition, the aqueous ink jet composition of the present disclosure may also be preferably applied to sublimation transfer which uses no intermediate transfer medium. As the sublimation transfer using no intermediate transfer medium, for example, there may be mentioned a method including a step of adhering an aqueous ink jet composition by an ink jet method to a strippable ink receiving layer provided on a recording medium (such as a film product); a step of performing sublimation diffusion dyeing from the ink receiving layer to the recording medium located thereunder by heating the recording medium provided with the ink receiving layer to which the aqueous ink jet composition is adhered; and a step of peeling the ink receiving layer from the recording medium to obtain a recorded portion.

EXAMPLES

Hereinafter, concrete examples of the present disclosure will be described.

[1] Preparation of Raw Liquid Used for Ink Jet Ink-Manufacturing (Aqueous Ink Jet Composition)

Example A1

First, C.I. Solvent Yellow 160: 1 which was a fluorescent dye functioning as the first component, a formalin condensate of sodium naphthalene sulfonate functioning as the second component, and purified water were mixed together at the rates shown in Table 1 and were then stirred at 3,000 rpm by a High Shear Mixer (manufactured by Silverson) to form a slurry. Subsequently, while being cooled with water, the slurry thus prepared was stirred and dispersed by a bead mill (LMZ015, manufactured by Ashizawa Finetech Ltd.) using glass beads having a diameter of 0.5 mm, after that, C.I. Acid Yellow 184 functioning as the third component was added at the rates shown in Table 1, and were then stirred at 3,000 rpm by a High Shear Mixer (manufactured by Silverson), so that as the aqueous ink jet composition, a raw liquid used for ink jet ink-manufacturing was manufactured.

The average particle diameter of C.I. Solvent Yellow 160: 1 in the raw liquid used for ink jet ink-manufacturing was 150 nm.

Comparative Example A1

Except for that the third component was not used, and the rates of the components were set as shown in Table 1, as the aqueous ink jet composition, a raw liquid used for ink jet ink-manufacturing was manufactured in a manner similar to that of Example A1.

The compositions and the like of the aqueous ink jet compositions (raw liquids used for ink jet ink-manufacturing) of the above Example and Comparative Example are shown in Table 1. In addition, in the table, C.I. Solvent Yellow 160: 1, the formalin condensate of sodium naphthalene sulfonate, and C.I. Acid Yellow 184 are represented by "SY160: 1", "C2-1", and "AY184", respectively. In addition, the raw liquids used for ink jet ink-manufacturing of the above Example and Comparative Example each had a viscosity in a range of 2.0 to 30 mPa·s, and the surface tensions thereof were each in a range of 25 to 50 mN/m. In addition, the viscosity was measured at 20° C. using a viscoelastic tester MCR-300 (manufactured by Pysica) in such a way that the shear rate was increased from 10 to 1,000 $s^-$, and a viscosity at a shear rate of 200 $s^-$ was read. In addition, the surface tension was measured at 20° C. by Wilhelmy method using a surface tension meter (CBVP-7, manufactured by Kyowa Interface Science Co., Ltd.).

TABLE 1

| | Blending Amount (Parts by Mass) | | | | | | |
| --- | --- | --- | --- | --- | --- | --- | --- |
| | First Component SY160: 1 | Second Component C2-1 | Third Component AY184 | Water | X2/X1 | X3/X1 | X3/X2 |
| Example A1 | 15 | 15 | 3.0 | 67 | 1.0 | 0.2 | 0.2 |
| Comparative Example A1 | 15 | 15 | 0 | 70 | 1.0 | 0 | 0 |

[2] Evaluation of Raw Liquid Used for Ink Jet Ink-Manufacturing

[2-1] Storage Stability (Change in Particle Diameter)

After the average particle diameter of the first component of each of the aqueous ink jet compositions (raw liquids used for ink jet ink-manufacturing) of the above Example and Comparative Example immediately after the manufacturing thereof and the average particle diameter of the first component thereof after the aqueous ink jet composition received in a predetermined container was left in an atmosphere at 60° C. for one week were obtained, from the values thus obtained, the rate of change in average particle diameter of the first component after the aqueous ink jet composition was left in an atmosphere at 60° C. for one week with respect to the average particle diameter of the first component immediately after the manufacturing thereof was obtained, and evaluation was performed in accordance with the following criteria. In addition, for the measurement of the average particle diameter, a Microtrac UPA (manufactured by Nikkiso Co., Ltd.) was used. As the rate of change in average particle diameter is increased, the storage stability is regarded to be degraded.

A: The rate of change in average particle diameter is less than 5%.
B: The rate of change in average particle diameter is 5% to less than 10%.
C: The rate of change in average particle diameter is 10% to less than 15%.
D: The rate of change in average particle diameter is 15% to less than 20%.
E: The rate of change in average particle diameter is 20% or more.

Those results are collectively shown in Table 2.

TABLE 2

| | Storage Stability (Change in Particle Diameter) |
|---|---|
| Example A1 | A |
| Comparative Example A1 | E |

As apparent from Table 2, an excellent result could be obtained from Example A1 of the present disclosure. On the other hand, from Comparative Example A1, a satisfactory result could not be obtained.

[3] Preparation of Ink Jet Ink (Aqueous Ink Jet Composition)

Example B1

After the raw liquid used for ink jet ink-manufacturing prepared in Example A1, glycerin, propylene glycol, BYK348 (manufactured by BYK Japan KK) functioning as the silicone-based surfactant, and purified water were mixed together at the rates shown in Table 3, stirring was performed at 3,000 rpm by a High Shear Mixer (manufactured by Silverson), so that an ink jet ink functioning as the aqueous ink jet composition was manufactured.

The average particle diameter of C.I. Solvent Yellow 160: 1 in the ink jet ink was 150 nm.

Example B2

First, C.I. Solvent Yellow 160: 1 which was a fluorescent dye functioning as the first component, a styrene-sodium styrene sulfonate copolymer functioning as the second component, glycerin, propylene glycol, BYK348 (manufactured by BYK Japan KK) functioning as the silicone-based surfactant, and purified water were mixed together at the rates shown in Table 3 and were then stirred at 3,000 rpm by a High Shear Mixer (manufactured by Silverson) to form a slurry. Subsequently, while being cooled with water, the slurry thus prepared was stirred and dispersed by a bead mill (LMZ015, manufactured by Ashizawa Finetech Ltd.) using glass beads having a diameter of 0.5 mm, after that, C.I. Acid Yellow 184 functioning as the third component was added at the rates shown in Table 3, and were then stirred at 3,000 rpm by a High Shear Mixer (manufactured by Silverson), so that as the aqueous ink jet composition, an ink jet ink was manufactured.

The average particle diameter of C.I. Solvent Yellow 160: 1 in the ink jet ink was 150 nm.

Examples B3 to B10

Except for that the types of the first component, the second component, and the third component and the rates of those components were set as shown in Table 1, an ink jet ink functioning as the aqueous ink jet composition was manufactured in a manner similar to that of the above Example B2.

Comparative Example B1

After the raw liquid used for ink jet ink-manufacturing prepared in the above Comparative Example A1, glycerin, propylene glycol, BYK348 (manufactured by BYK Japan KK) functioning as the silicone-based surfactant, and purified water were mixed together at the rates shown in Table 3, stirring was performed at 3,000 rpm by a High Shear Mixer (manufactured by Silverson), so that an ink jet ink functioning as the aqueous ink jet composition was manufactured. That is, the ink jet ink of this Comparative Example contained no third component.

The average particle diameter of C.I. Solvent Yellow 160: 1 in the ink jet ink was 150 nm.

Comparative Example B2

First, C.I. Solvent Yellow 160: 1 which was a fluorescent dye functioning as the first component, glycerin, propylene glycol, BYK348 (manufactured by BYK Japan KK) functioning as the silicone-based surfactant, and purified water were mixed together at the rates shown in Table 3 and were then stirred at 3,000 rpm by a High Shear Mixer (manufactured by Silverson) to form a slurry. Subsequently, while being cooled with water, the slurry thus prepared was stirred and dispersed by a bead mill (LMZ015, manufactured by Ashizawa Finetech Ltd.) using glass beads having a diameter of 0.5 mm, after that, C.I. Acid Yellow 184 functioning as the third component was added at the rates shown in Table 3, and were then stirred at 3,000 rpm by a High Shear Mixer (manufactured by Silverson), so that as the aqueous ink jet composition, an ink jet ink was manufactured. That is, the ink jet ink of this Comparative Example contained no second component.

The average particle diameter of C.I. Solvent Yellow 160: 1 in the ink jet ink was 150 nm.

Comparative Examples B3 to B6

Except for that the types of the components used for preparation of the ink jet ink and the rates thereof were set as shown in Table 3, an ink jet ink functioning as the aqueous ink jet composition was manufactured in a manner similar to that of the above Example B2.

Conditions of the aqueous ink jet compositions (ink jet inks) of the above Examples and Comparative Examples are collectively shown in Table 3. In addition, in the table, C.I. Solvent Yellow 160: 1 is represented by "SY160: 1", C.I. Disperse Yellow 82 is represented by "DY82", C.I. Disperse Yellow 184 is represented by "DY184", the formalin condensate of sodium naphthalene sulfonate is represented by "C2-1", the sodium lignin sulfonate is represented by "C2-2", the styrene-sodium styrene sulfonate copolymer is represented by "C2-3", C.I. Acid Yellow 184 is represented by "AY184", C.I. Acid Yellow 250 is represented by "AY250", glycerin is represented by "Gly", propylene glycol is represented by "PG", BYK348 (manufactured by BYK Japan KK) functioning as the silicone-based surfactant is represented by "BYK348", C.I. Disperse Yellow 54 functioning as another component is represented by "DY54", C.I. Acid Yellow 54 functioning as another component is represented by "AY54", and a styrene-sodium acrylate copolymer functioning as another component is represented by "C2'". In addition, the ink jet inks of the above Examples B1 to B10 each had a viscosity in a range of 2.0 to 5.0 mPa·s, and the surface tensions thereof were each in a range of 20 to 35 mN/m. In addition, the viscosity was measured at 20° C. using a viscoelastic tester MCR-300 (manufactured by Pysica) in such a way that the shear rate was increased from 10 to 1,000 s⁻, and a viscosity at a shear rate of 200 s⁻ was read. In addition, the surface tension was measured at 20° C. by Wilhelmy method using a surface tension meter (CBVP-7, manufactured by Kyowa Interface Science Co., Ltd.).

TABLE 3

| | Blending Amount (Parts by Mass) | | | | | | | | | | |
|---|---|---|---|---|---|---|---|---|---|---|---|
| | First Component | | | Second Component | | | Third Component | | Solvent Other Than Water | | Surfactant |
| | SY160:1 | DY82 | DY184 | C2-1 | C2-2 | C2-3 | AY184 | AY250 | Gly | PG | BYK348 |
| Example B1 | 5.0 | 0 | 0 | 5.0 | 0 | 0 | 1.0 | 0 | 15 | 10 | 0.5 |
| Example B2 | 5.0 | 0 | 0 | 0 | 0 | 5.0 | 1.0 | 0 | 15 | 10 | 0.5 |
| Example B3 | 8.0 | 0 | 0 | 8.0 | 0 | 0 | 2.0 | 0 | 10 | 10 | 0.5 |
| Example B4 | 5.0 | 0 | 0 | 5.0 | 0 | 0 | 0.005 | 0 | 15 | 10 | 0.5 |
| Example B5 | 5.0 | 0 | 0 | 0 | 0 | 5.0 | 6.0 | 0 | 10 | 10 | 0.5 |
| Example B6 | 0 | 5.0 | 0 | 5.0 | 0 | 0 | 1.0 | 0 | 15 | 10 | 0.5 |
| Example B7 | 0 | 0 | 5.0 | 5.0 | 0 | 0 | 1.0 | 0 | 15 | 10 | 0.5 |
| Example B8 | 5.0 | 0 | 0 | 0 | 0 | 5.0 | 0 | 1.0 | 15 | 10 | 0.5 |
| Example B9 | 5.0 | 0 | 0 | 0 | 5.0 | 0 | 1.0 | 0 | 15 | 10 | 0.5 |
| Example B10 | 4.0 | 0.5 | 0.0 | 4.0 | 0.5 | 0.0 | 0.9 | 0.1 | 15 | 10 | 0.5 |
| Comparative Example B1 | 5.0 | 0 | 0 | 5.0 | 0 | 0 | 0 | 0 | 15 | 10 | 0.5 |
| Comparative Example B2 | 5.0 | 0 | 0 | 0 | 0 | 0 | 1.0 | 0 | 15 | 10 | 0.5 |
| Comparative Example B3 | 0 | 0 | 0 | 5.0 | 0 | 0 | 1.0 | 0 | 15 | 10 | 0.5 |
| Comparative Example B4 | 5.0 | 0 | 0 | 0 | 0 | 0 | 1.0 | 0 | 15 | 10 | 0.5 |
| Comparative Example B5 | 5.0 | 0 | 0 | 0 | 0 | 0 | 0 | 0 | 15 | 10 | 0.5 |
| Comparative Example B6 | 5.0 | 0 | 0 | 5.0 | 0 | 0 | 0 | 0 | 15 | 10 | 0.5 |

| | Blending Amount (Parts by Mass) | | | | | | |
|---|---|---|---|---|---|---|---|
| | Other Components | | | Purified Water | X2/X1 | X3/X1 | X3/X2 |
| | DY54 | C2' | AY54 | | | | |
| Example B1 | 0 | 0 | 0 | 63.5 | 1.0 | 0.2 | 0.2 |
| Example B2 | 0 | 0 | 0 | 63.5 | 1.0 | 0.2 | 0.2 |
| Example B3 | 0 | 0 | 0 | 61.5 | 1.0 | 0.25 | 0.25 |
| Example B4 | 0 | 0 | 0 | 64.495 | 1.0 | 0.001 | 0.001 |
| Example B5 | 0 | 0 | 0 | 63.5 | 1.0 | 1.2 | 1.2 |
| Example B6 | 0 | 0 | 0 | 63.5 | 1.0 | 0.2 | 0.2 |
| Example B7 | 0 | 0 | 0 | 63.5 | 1.0 | 0.2 | 0.2 |
| Example B8 | 0 | 0 | 0 | 63.5 | 1.0 | 0.2 | 0.2 |
| Example B9 | 0 | 0 | 0 | 63.5 | 1.0 | 0.2 | 0.2 |
| Example B10 | 0 | 0 | 0 | 63.5 | 1.0 | 0.2 | 0.2 |
| Comparative Example B1 | 0 | 0 | 0 | 64.5 | 1.0 | 0 | 0 |
| Comparative Example B2 | 0 | 0 | 0 | 68.5 | 0 | 0.2 | — |
| Comparative Example B3 | 5.0 | 0 | 0 | 63.5 | — | — | 0.2 |
| Comparative Example B4 | 0 | 5.0 | 0 | 63.5 | 0 | 0.2 | — |
| Comparative Example B5 | 0 | 5.0 | 0 | 64.5 | 0 | 0 | — |
| Comparative Example B6 | 0 | 0 | 1.0 | 63.5 | 1.0 | 0 | 0 |

[4] Evaluation of Ink Jet Ink

[4-1] Storage Stability (Change in Particle Diameter)

After the average particle diameter of the first component (however, in the case of Comparative Example B3, C.I. Disperse Yellow 54 was used instead of the first component) of each of the aqueous ink jet compositions (ink jet inks) of the above Examples and Comparative Examples immediately after the manufacturing thereof and the average particle diameter of the first component thereof (however, in the case of Comparative Example B3, C.I. Disperse Yellow 54 was used instead of the first component) after the aqueous ink jet composition received in a predetermined container was left in an atmosphere at 60° C. for one week were obtained, from the values thus obtained, the rate of change in average particle diameter of the first component (however, in the case of Comparative Example B3, C.I. Disperse Yellow 54 was used instead of the first component) after the aqueous ink jet composition was left in an atmosphere at 60° C. for one week with respect to the average particle diameter of the first component (however, in the case of Comparative Example B3, C.I. Disperse Yellow 54 was used instead of the first component) immediately after the manufacturing thereof was obtained, and evaluation was performed in accordance with the following criteria. In addition, for the measurement of the average particle diameter, a Microtrac UPA (manufactured by Nikkiso Co., Ltd.) was used. As the rate of change in average particle diameter is increased, the storage stability is regarded to be degraded, and the ejection stability is believed to be seriously adversely influenced.

A: The rate of change in average particle diameter is less than 5%.
B: The rate of change in average particle diameter is 5% to less than 10%.
C: The rate of change in average particle diameter is 10% to less than 15%.
D: The rate of change in average particle diameter is 15% to less than 20%.
E: The rate of change in average particle diameter is 20% or more.

[4-2] Clogging Recovery

After the aqueous ink jet composition (ink jet ink) of each of the above Examples and Comparative Examples was filled in a predetermined ink receiving container, this receiving container was mounted in a recording apparatus PX-H6000 (manufactured by Seiko Epson Corporation). In addition, the ink receiving container (the ink receiving container described above) of PX-H6000 manufactured by Seiko Epson Corporation has an ink inlet through which the aqueous ink jet composition can be replenished, and when being fitted to the recording apparatus so as to be ready to use, the container described above is opened to the air.

After all the nozzles were confirmed to normally eject the aqueous ink jet composition, while the recording apparatus was placed under the normal conditions, the power source was put off, and the recording apparatus was left in an atmosphere at 40° C. for one month.

Subsequently, a recovery operation was repeatedly performed by suction until the normal ejection was obtained, and by the use of the number of recovery operations thus performed, evaluation was performed in accordance with the following criteria.

A: Normal ejection was performed immediately after the power source is put on. Alternatively, normal ejection was obtained when the number of recovery operations was one to three.
B: Normal ejection was obtained when the number of recovery operations was four to six.
C: Normal ejection was obtained when the number of recovery operations was seven to nine.
D: After the recovery operation was performed 9 times, the recording apparatus was left at room temperature for 12 hours, and after the recovery operation was further performed one to three times, normal ejection was obtained.
E: After the recovery operation was performed 9 times, the recording apparatus was left at room temperature for 12 hours, and although the recovery operation was further performed one to three times, normal ejection was not obtained.

[4-3] Chromogenic Property (Fluorescence Intensity)

After the aqueous ink jet composition (ink jet ink) of each of the above Examples and Comparative Examples was filled in a predetermined ink receiving container, the receiving container was mounted in a recording apparatus PX-H6000 (manufactured by Seiko Epson Corporation).

After all the nozzles were confirmed to normally eject the aqueous ink jet composition, the ink jet ink was ejected to TRANSJET Classic (manufactured by Cham Paper) functioning as the intermediate transfer medium to adhere a pattern having an ejection amount of 10% at a recording resolution of 1,440 by 720 dpi. In addition, the operation environment of the recording apparatus (printer) was set at 25° C.

Subsequently, one side of the intermediate transfer medium to which the aqueous ink jet composition was adhered was placed in close contact with a cloth (100% of a polyester, Amina, manufactured by Toray Industries, Inc.) which was a white recording medium, and under the conditions described above, sublimation transfer was performed by heating at 200° C. for 60 seconds using a heat press machine (TP-608M, manufactured by Taiyoseiki Co., Ltd.), so that a recorded portion was obtained.

Evaluation of the fluorescence intensity of each recorded portion thus obtained was performed. In particular, by the use of a spectrophotometer FD-7 (manufactured by Konica Minolta, Inc.), after a fluorescent brightening intensity of a pattern having an ink ejection amount of 10% on the cloth, which was the recorded portion, was measured three times, the average value was obtained therefrom and was then evaluated in accordance with the following criteria. In addition, the measurement conditions are as described below.

Measurement method: reflection measurement
Lighting conditions: M1 [D50]
Density white reference: absolute value
Observation field: 2°
Observation light source: D50
Polarizing filter: not mounted A: The fluorescent brightening intensity is 4 or more.
B: The fluorescent brightening intensity is 3 to less than 4.
C: The fluorescent brightening intensity is 2 to less than 3.
D: The fluorescent brightening intensity is 1 to less than 2.
E: the fluorescent brightening intensity is less than 1.

Those results are collectively shown in Table 4.

TABLE 4

| | Storage Stability (Change in Particle Diameter) | Clogging Recovery | Chromogenic Property (Fluorescence Intensity) |
|---|---|---|---|
| Example B1 | A | A | A |
| Example B2 | A | A | A |
| Example B3 | A | B | A |
| Example B4 | C | B | A |
| Example B5 | A | C | A |

TABLE 4-continued

| | Storage Stability (Change in Particle Diameter) | Clogging Recovery | Chromogenic Property (Fluorescence Intensity) |
|---|---|---|---|
| Example B6 | A | A | B |
| Example B7 | A | A | B |
| Example B8 | C | A | A |
| Example B9 | B | B | A |
| Example B10 | A | A | A |
| Comparative Example B1 | E | B | A |
| Comparative Example B2 | E | E | A |
| Comparative Example B3 | A | A | E |
| Comparative Example B4 | A | E | A |
| Comparative Example B5 | E | C | A |
| Comparative Example B6 | E | B | A |

As apparent from Table 4, excellent results can be obtained from the above Examples of the present disclosure. On the other hand, satisfactory results could not be obtained from the above Comparative Examples. In addition, according to the present disclosure, although the first component is preferably transferred to the final recorded portion (cloth), the third component remains on the intermediate transfer medium, and the third component imparts no adverse influence to the appearance and the like of the recorded portion, so that excellent color tone of the first component can be obtained.

Hereinafter, a preferable second embodiment of the present disclosure will be described in detail.

Aqueous Ink Jet Composition

Among various fluorescent dyes, C.I. Solvent Yellow 160: 1, C.I. Disperse Yellow 82, and C.I. Disperse Yellow 184 have features, such as excellent fluorescence intensity, but also have the following problems. That is when the above fluorescent dyes were each used as a constituent component of an aqueous ink jet composition in the past, it was difficult to simultaneously achieve the storage stability of the aqueous ink jet composition and the clogging resistance by which clogging of a head filter and/or a nozzle caused by drying is not likely to occur.

Accordingly, in order to simultaneously achieve the storage stability of an aqueous ink jet composition containing the fluorescent dye described above and the clogging resistance by which clogging of a head filter and/or a nozzle caused by drying is not likely to occur while the excellent features of the fluorescent dye are appropriately obtained, intensive research was carried out by the present inventor, and as a result, the present disclosure was made.

That is, the aqueous ink jet composition of the present disclosure comprises at least two types of dye components selected from a specific yellow dye group consisting of C.I. Solvent Yellow 160: 1, C.I. Disperse Yellow 82, and C.I. Disperse Yellow 184 and a sulfonic acid-based dispersant which is a dispersant having at least one chemical structure of a sulfo group and a salt thereof.

By the structure as described above, an aqueous ink jet composition which simultaneously achieves the storage stability and the clogging resistance by which clogging of a head filter and/or a nozzle caused by drying is not likely to occur can be provided while the features of the above dye components (specific yellow dyes) are obtained.

The reasons the excellent advantage as described above can be obtained are believed as described below. That is, since the sulfonic acid-based dispersant having at least one chemical structure of a highly hydrophilic sulfo group and a salt thereof is used, the aqueous ink jet composition can be effectively suppressed from being dried at a nozzle and the like, and since at least two types of specific yellow dyes (at least two types of dye components selected from the specific yellow dye group consisting of C.I. Solvent Yellow 160: 1, C.I. Disperse Yellow 82, and C.I. Disperse Yellow 184) which have different chemical structures from each other in view of the entire compound but have the same chemical structure of the coumarin skeleton are contained, compared to the case in which only one specific yellow dye is contained, crystallization of the specific yellow dyes, that is, in particular, precipitation of crystals having a predetermined size or more, can be effectively prevented.

The reason the crystallization of the specific yellow dyes can be prevented is believed as described below. That is, as described above, since the specific yellow dyes forming the specific yellow dye group have the same chemical structure of the coumarin skeleton, during the storage or the like, a plurality of molecules may be stabilized in some cases while being located close to each other; however, since the specific yellow dyes have the different chemical structures from each other in view of the entire compound, an excessively large number of specific yellow dye molecules are prevented from being aggregated. Hence, even if the specific yellow dye molecules are aggregated to each other, the aggregates thus formed are not likely to grow to large crystals, and since the sulfonic acid-based dispersant is also used together therewith, a stable dispersion state of extremely small aggregates is maintained, or the above aggregates are re-decomposed and/or re-diffused.

On the other hand, when the conditions as described above are not satisfied, a satisfactory result cannot be obtained.

For example, when one specific yellow dye is only used, and at lest two types of specific yellow dyes are not used, the storage stability of the aqueous ink jet composition is inferior, and during the storage, foreign materials are liable to be generated in the aqueous ink jet composition.

In addition, when another fluorescent dye is used instead of the specific yellow dye, and no specific yellow dye is used, at a recorded portion formed by using an aqueous ink jet composition, a sufficient fluorescence intensity is difficult to obtain. In addition, in this specification, the "recorded portion" is the concept including, besides a portion of a recording medium to which an aqueous ink jet composition is applied by an ink jet method, a portion to which a constituent component of the aqueous ink jet composition is transferred in the case in which the aqueous ink jet composition is applied to a thermal transfer printing method such as sublimation printing.

In addition, in the case in which the sulfonic acid-based dispersant is not used, it is difficult to sufficiently improve dispersion stability in the aqueous ink jet composition, and during the storage, foreign materials are liable to be generated in the aqueous ink jet composition.

In addition, in the case in which, instead of using the sulfonic acid-based dispersant, a dispersant other than the sulfonic acid-based dispersant, such as a dispersant having a high hydrophobic functional group, such as a carboxyl group, as compared to a sulfo group is used, for example, when an ink jet ink functioning as the aqueous ink jet composition is placed in a state in which the ink is easily dried, such as in a state of nozzle idle running or long-term storage, a solid component of the aqueous ink jet composition is particularly liable to be precipitated, and as a result, an ejection defect of the aqueous ink jet composition caused, for example, by clogging of a head filter and/or a nozzle is liable to be generated.

In addition, in this specification, the aqueous ink jet composition is the concept including, besides an ink itself to be ejected by an ink jet method, a raw liquid used for preparation of the ink. In other words, the aqueous ink jet composition of the present disclosure may be a composition to be ejected as it is by an ink jet method or may also be a composition to be ejected by an ink jet method after being processed by dilution or the like.

Specific Yellow Dye

The aqueous ink jet composition contains at least two types of specific yellow dyes selected from the specific yellow dye group consisting of C.I. Solvent Yellow 160: 1, C.I. Disperse Yellow 82, and C.I. Disperse Yellow 184.

Although each being a yellow-based fluorescent dye and having a chemical structure which includes a coumarin skeleton, those specific yellow dyes have different chemical structures from each other in view of the entire compound.

Since at least two type of specific yellow dyes as described above are contained together with the sulfonic acid-based dispersant which will be described later in detail, the specific yellow dyes are mostly stably dispersed in the aqueous ink jet composition.

When one component having the highest content among the dye components forming the specific yellow dye group is regarded as a first dye component, the content of the first dye component with respect to the whole specific yellow dye group is preferably 50.0 to 99.9 percent by mass, more preferably 60.0 to 99.5 percent by mass, and further preferably 70.0 to 98.0 percent by mass.

Accordingly, the fluorescence intensity and the color tone of the recorded portion formed by using the aqueous ink jet composition can be made more preferable, and in addition, the storage stability of the aqueous ink jet composition can be further improved.

In addition, among the specific yellow dyes forming the specific yellow dye group, when at least two types thereof are contained to have the same content, and no specific yellow dye which has a content higher than that described above is contained, one of the specific yellow dyes having the same content described above is regarded as the first dye component. For example, with respect to the whole specific yellow dye group forming the aqueous ink jet composition, when the content of C.I. Solvent Yellow 160: 1 is 35.0 percent by mass, the content of C.I. Disperse Yellow 82 is 35.0 percent by mass, and the content of C.I. Disperse Yellow 184 is 30.0 percent by mass, C.I. Solvent Yellow 160: 1 or C.I. Disperse Yellow 82 is regarded as the first dye component. In addition, for example, with respect to the whole specific yellow dye group forming the aqueous ink jet composition, when the content of C.I. Solvent Yellow 160: 1, the content of C.I. Disperse Yellow 82, and the content of C.I. Disperse Yellow 184 are the same, that is, are each 33.3 percent by mass (100/3 percent by mass), one of C.I. Solvent Yellow 160: 1, C.I. Disperse Yellow 82, and C.I. Disperse Yellow 184 is regarded as the first dye component.

When one component having the highest content among the dye components forming the specific yellow dye group is regarded as the first dye component, one component among the dye components forming the specific yellow dye group, the content of which is the same as or second to the content of the first dye component, is regarded as the second dye component, the content of the first dye component in the aqueous ink jet composition is represented by X1 percent by mass, and the content of the second dye component in the aqueous ink jet composition is represented by X2 percent by mass, $0.001 \leq X2/X1 \leq 1.0$ is preferably satisfied, $0.01 \leq X2/X1 \leq 0.8$ is more preferably satisfied, and $0.02 \leq X2/X1 \leq 0.5$ is further preferably satisfied.

Accordingly, the fluorescence intensity and the color tone of the recorded portion formed by using the aqueous ink jet composition can be made more preferable, and in addition, the storage stability of the aqueous ink jet composition can be further improved.

In addition, among the specific yellow dyes forming the specific yellow dye group, when at least two types thereof are contained to have the same content, and no specific yellow dye which has a content higher than that described above is contained, one of the specific yellow dyes having the same content described above is regarded as the first dye component, and the other one (dye component other then the first dye component) of the specific yellow dyes having the same content is regarded as the second dye component. For example, with respect to the whole specific yellow dye group forming the aqueous ink jet composition, when the content of C.I. Solvent Yellow 160: 1 is 35.0 percent by mass, the content of C.I. Disperse Yellow 82 is 35.0 percent by mass, and the content of C.I. Disperse Yellow 184 is 30.0 percent by mass, C.I. Solvent Yellow 160: 1 or C.I. Disperse Yellow 82 is regarded as the first dye component, and the other (dye component other than the first dye component) of C.I. Solvent Yellow 160: 1 and C.I. Disperse Yellow 82 is regarded as the second dye component. In addition, for example, with respect to the whole specific yellow dye group forming the aqueous ink jet composition, when the content of C.I. Solvent Yellow 160: 1, the content of C.I. Disperse Yellow 82, and the content of C.I. Disperse Yellow 184 are the same, that is, are each 33.3 percent by mass (100/3 percent by mass), one of C.I. Solvent Yellow 160: 1, C.I. Disperse Yellow 82, and C.I. Disperse Yellow 184 is regarded as the first dye component, and the other (dye component other than the first dye component) of C.I. Solvent Yellow 160: 1, C.I. Disperse Yellow 82, and C.I. Disperse Yellow 184 is regarded as the second dye component.

The aqueous ink jet composition preferably contains at least C.I. Solvent Yellow 160: 1, and one component (first dye component) having the highest content among the dye components forming the specific yellow dye group is preferably C.I. Solvent Yellow 160: 1.

Accordingly, the fluorescence intensity and the color tone of the recorded portion formed by using the aqueous ink jet composition can be made more preferable, and in addition, the storage stability of the aqueous ink jet composition can be further improved.

In particular, the rate of C.I. Solvent Yellow 160: 1 in the whole specific yellow dyes forming the aqueous ink jet composition is preferably 60.0 to 99.0 percent by mass, more preferably 62.0 to 98.5 percent by mass, and further preferably 64.0 to 98.0 percent by mass.

Accordingly, the fluorescence intensity and the color tone of the recorded portion formed by using the aqueous ink jet composition can be made more preferable, and in addition, the storage stability of the aqueous ink jet composition can be further improved.

When the aqueous ink jet composition contains C.I. Solvent Yellow 160: 1, in particular, the following conditions are preferably satisfied. That is, it is preferable that the component (first dye component) having the highest content among the dye components forming the specific yellow dye group is C.I. Solvent Yellow 160: 1, the content of C.I. Solvent Yellow 160: 1 with respect to the whole specific yellow dye group is 60.0 to 99.0 percent by mass, and the content of C.I. Solvent Yellow 160: 1 in the aqueous ink jet composition is 0.5 to 25.0 percent by mass.

Accordingly, the fluorescence intensity and the color tone of the recorded portion formed by using the aqueous ink jet composition can be made more preferable, and in addition, the storage stability of the aqueous ink jet composition can be further improved.

The average particle diameter of the specific yellow dyes in the aqueous ink jet composition is preferably 50 to 250 nm, more preferably 75 to 200 nm, and further preferably 100 to 150 nm.

Accordingly, the storage stability of the aqueous ink jet composition is further improved. In addition, the recorded portion formed by using the aqueous ink jet composition can be further effectively sublimated, and hence, the aqueous ink jet composition can be further preferably applied to sublimation printing.

In addition, in this specification, the average particle diameter is represented by a volume-basis average particle diameter unless otherwise particularly noted. The average particle diameter can be obtained, for example, by measurement using a Microtrac UPA (manufactured by Nikkiso Co., Ltd.).

The content of the specific yellow dye group in the aqueous ink jet composition is preferably 0.6 to 26 percent by mass, more preferably 1.0 to 23 percent by mass, and further preferably 2.0 to 17 percent by mass.

Accordingly, a higher color density and a higher fluorescence intensity can be obtained at the recorded portion formed by using the aqueous ink jet composition, and in addition, the storage stability of the aqueous ink jet composition can be further improved.

In particular, when the aqueous ink jet composition is an ink itself to be ejected by an ink jet method, the content of the specific yellow dye group in the ink is preferably 0.6 to 17 percent by mass, more preferably 1.0 to 14 percent by mass, and further preferably 2.0 to 9.0 percent by mass.

In addition, when the aqueous ink jet composition is a raw liquid used for preparation of an ink to be ejected by an ink jet method, the content of the specific yellow dye group in the raw liquid is preferably 8.0 to 26 percent by mass, more preferably 9.0 to 23 percent by mass, and further preferably 10 to 17 percent by mass.

Sulfonic Acid-Based Dispersant

The aqueous ink jet composition of the present disclosure contains the sulfonic acid-based dispersant which is a dispersant having at least one chemical structure of a sulfo group and a salt thereof.

When the aqueous ink jet composition is applied to a recording apparatus by an ink jet method, the sulfonic acid-based dispersant primarily has a function to improve the dispersibility of the specific yellow dye described above while effectively preventing precipitation of a solid component of the ink jet ink caused by drying.

Although the sulfonic acid-based dispersant is not particularly limited as long as having at least one chemical structure of a sulfo group and a salt thereof, that is, having a structure which generates $-SO_3^-$ by ionization, at least one selected from the group consisting of a formalin condensate of sodium naphthalene sulfonate, sodium lignin sulfonate, and a styrene-sodium styrene sulfonate copolymer is preferable, and at least one of a formalin condensate of sodium naphthalene sulfonate and a styrene-sodium styrene sulfonate copolymer is more preferable. In particular, the total of the rate of the formalin condensate of sodium naphthalene sulfonate and the rate of the styrene-sodium styrene sulfonate copolymer in the whole sulfonic acid-based dispersant forming the aqueous ink jet composition is preferably 50 to 100 percent by mass and more preferably 70 to 100 percent by mass.

Accordingly, the prevention of precipitation of the solid component of the ink jet ink caused by drying and the improvement in dispersibility of the specific yellow dye can be simultaneously achieved at a higher level.

When the content of the specific yellow dye group in the aqueous ink jet composition is represented by XD percent by mass, and the content of the sulfonic acid-based dispersant in the aqueous ink jet composition is represented by XS percent by mass, $0.2 \leq XS/XD \leq 5.0$ is preferably satisfied, $0.3 \leq XS/XD \leq 2.5$ is more preferably satisfied, and $0.4 \leq XS/XD \leq 2.0$ is further preferably satisfied.

Accordingly, the fluorescence intensity and the color tone of the recorded portion formed by using the aqueous ink jet composition can be made more preferable, and in addition, the storage stability of the aqueous ink jet composition and the clogging resistance by which clogging of a head filter and/or a nozzle caused by drying is not likely to occur can be simultaneously achieved at a higher level.

The content of the sulfonic acid-based dispersant in the aqueous ink jet composition is preferably 0.5 to 20 percent by mass, more preferably 1.0 to 18 percent by mass, and further preferably 2.0 to 15 percent by mass.

Accordingly, the content of the specific yellow dye group can be effectively prevented from being excessively decreased, and while the functions thereof are reliably obtained, the advantage of the presence of the sulfonic acid-based dispersant as described above can be more significantly obtained.

In particular, when the aqueous ink jet composition is an ink itself to be ejected by an ink jet method, the content of the sulfonic acid-based dispersant in the ink is preferably 0.5 to 13 percent by mass, more preferably 1.0 to 12 percent by mass, and further preferably 2.0 to 9.0 percent by mass.

In addition, when the aqueous ink jet composition is a raw liquid used for preparation of an ink to be ejected by an ink jet method, the content of the sulfonic acid-based dispersant in this raw liquid is preferably 8.0 to 20 percent by mass, more preferably 9.0 to 19 percent by mass, and further preferably 10 to 18 percent by mass.

In addition, when the sulfonic acid-based dispersant forming the aqueous ink jet composition contains a plurality of compounds, as the content of the sulfonic acid-based dispersant, the total of the contents of the plurality of compounds is to be used.

Water

The aqueous ink jet composition contains water, and as this water, for example, purified water, such as RO water, distilled water, or ion-exchanged water, may be used.

Although the content of the water in the aqueous ink jet composition is not particularly limited, the content is preferably 30 to 85 percent by mass, more preferably 35 to 80 percent by mass, and further preferably 40 to 75 percent by mass.

Accordingly, the viscosity of the aqueous ink jet composition can be more reliably adjusted to a preferable value, and ejection stability by an ink jet method can be further improved.

Solvent Other than Water

The aqueous ink jet composition may contain a solvent other than water.

Accordingly, the viscosity of the aqueous ink jet composition can be preferably adjusted, and a moisture-retaining property of the aqueous ink jet composition can be improved. As a result, liquid droplet ejection by an ink jet method can be more stably performed.

As the solvent contained in the aqueous ink jet composition other than water, for example, there may be mentioned glycerin, propylene glycol, and 2-pyrrolidone.

Since at least one of those solvents is contained, an evaporation rate can be slowed by an excellent moisture-retaining property, and hence, more stable liquid droplet ejection can be performed.

The content of the solvent contained in the aqueous ink jet composition other than water is preferably 0 to 45 percent by mass, more preferably 10 to 43 percent by mass, and further preferably 15 to 40 percent by mass.

Accordingly, the advantage of the presence of the solvent other than water can be more significantly obtained.

Surfactant

The aqueous ink jet composition may contain a surfactant.

Accordingly, wettability of the aqueous ink jet composition to a recording medium (base material) can be made more preferable, and more preferable image quality can be advantageously obtained.

As the surfactant contained in the aqueous ink jet composition, for example, various surfactants, such as an anionic surfactant, a cationic surfactant, and a nonionic surfactant, may be used.

In more particular, as the surfactant contained in the aqueous ink jet composition, for example, there may be mentioned an acetylene-based surfactant, a silicone-based surfactant, and a fluorine-based surfactant.

When the aqueous ink jet composition contains a silicone-based surfactant, the wettability of the aqueous ink jet composition to the recording medium (base material) can be made more preferable, and a more excellent gradation image (recorded portion) can be formed.

When the aqueous ink jet composition contains a silicone-based surfactant, the content of the silicone-based surfactant in the aqueous ink jet composition with respect to 100 parts by mass of the specific yellow dye group is preferably 5.0 to 150 parts by mass, more preferably 7.0 to 140 parts by mass, and further preferably 10 to 70 parts by mass.

Accordingly, the advantage of the presence of the silicone-based surfactant described above can be more significantly obtained.

As a commercially available silicone-based surfactant, for example, there may be mentioned BYK-306, BYK-307, BYK-333, BYK-337, BYK-341, BYK-345, BYK-346, BYK-347, BYK-348, BYK-349, and BYK-378 (trade names, manufactured by BYK Japan KK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.).

Sulfo Group-Containing Coumarin Skeleton Compound

The aqueous ink jet composition of the present disclosure may contain a sulfo group-containing coumarin skeleton compound having a coumarin skeleton and at least one chemical structure of a sulfo group and a salt thereof.

Since including both a coumarin skeleton which is a chemical structure present in the molecule of the specific yellow dye and at least one chemical structure of a sulfo group and a salt thereof which is a chemical structure present in the molecule of the sulfonic acid-based dispersant, the sulfo group-containing coumarin skeleton compound has an excellent affinity with the specific yellow dye and the sulfonic acid-based dispersant. Since the sulfo group-containing coumarin skeleton compound as described above is contained, the storage stability of the aqueous ink jet composition can be further improved. In particular, while the function of the specific yellow dye and the function of the sulfonic acid-based dispersant are sufficiently obtained, the storage stability of the aqueous ink jet composition can be further improved. In addition, the sulfo group-containing coumarin skeleton compound is a component which is not likely to adversely influence sublimation printing.

Although the sulfo group-containing coumarin skeleton compound may be a component which has, in its molecule, at least one chemical structure of a sulfo group and a salt thereof together with a coumarin skeleton, at least one selected from the group consisting of C.I. Acid Yellow 184 and C.I. Acid Yellow 250 is preferable.

Accordingly, while the function of the specific yellow dye and the function of the sulfonic acid-based dispersant are more effectively obtained, the storage stability of the aqueous ink jet composition can be particularly improved.

In addition, C.I. Acid Yellow 184 and C.I. Acid Yellow 250 have the chemical structures represented by the following formulas (1) and (2), respectively.

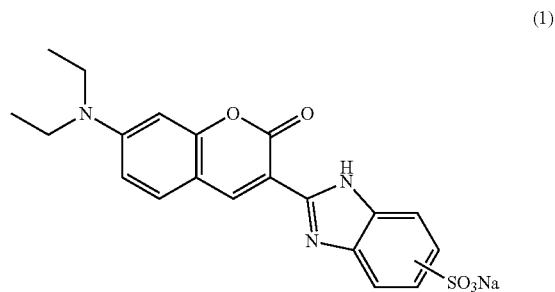

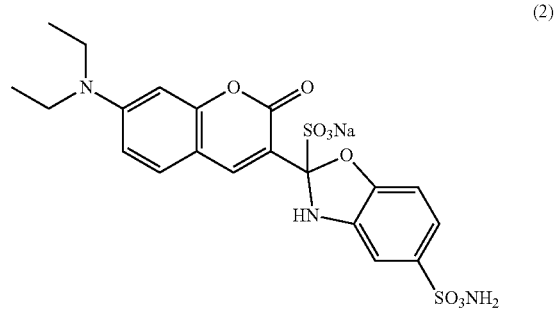

When the aqueous ink jet composition contains the sulfo group-containing coumarin skeleton compound, the content of the sulfo group-containing coumarin skeleton compound in the aqueous ink jet composition is preferably 0.001 to 5.0 percent by mass, more preferably 0.005 to 4.0 percent by mass, and further preferably 0.03 to 3.0 percent by mass.

Accordingly, while the content of the specific yellow dye and the content of the sulfonic acid-based dispersant can be effectively prevented from being excessively decreased, and the functions thereof are reliably obtained, the advantage of the presence of the sulfo group-containing coumarin skeleton compound as described above can be more significantly obtained.

In particular, when the aqueous ink jet composition is an ink itself to be ejected by an ink jet method, the content of the sulfo group-containing coumarin skeleton compound in the ink is preferably 0.001 to 2.3 percent by mass, more preferably 0.005 to 1.9 percent by mass, and further preferably 0.03 to 1.7 percent by mass.

In addition, when the aqueous ink jet composition is a raw liquid used for preparation of an ink to be ejected by an ink jet method, the content of the sulfo group-containing coumarin skeleton compound in the ink is preferably 0.9 to 5.0 percent by mass, more preferably 1.4 to 4.0 percent by mass, and further preferably 1.9 to 3.0 percent by mass.

In addition, when the sulfo group-containing coumarin skeleton compound forming the aqueous ink jet composition contains a plurality of compounds, as the content of the sulfo group-containing coumarin skeleton compound, the total of the contents of the plurality of compounds is to be used.

When the content of the specific yellow dye group in the aqueous ink jet composition is represented by XD percent by mass, and the content of the sulfo group-containing coumarin skeleton compound is represented by XC percent by mass, $0.0005 \leq XC/XD \leq 2.7$ is preferably satisfied, $0.002 \leq XC/XD \leq 1.9$ is more preferably satisfied, and $0.04 \leq XC/XD \leq 0.9$ is further preferably satisfied.

Accordingly, the fluorescence intensity and the color tone of the recorded portion formed by using the aqueous ink jet composition and the storage stability thereof can be simultaneously achieved at a higher level.

In the aqueous ink jet composition, when the content of the sulfonic acid-based dispersant is represented by XS percent by mass, and the content of the sulfo group-containing coumarin skeleton compound is represented by XC percent by mass, $0.0005 \leq XC/XS \leq 2.8$ is preferably satisfied, $0.005 \leq XC/XS \leq 1.8$ is more preferably satisfied, and $0.05 \leq XC/XS \leq 1.6$ is further preferably satisfied.

Accordingly, while the precipitation of the solid component of the ink jet ink caused by drying can be effectively prevented, the storage stability of the aqueous ink jet composition can be further improved.

Other Components

The aqueous ink jet composition may contains components (other components) other than the components described above.

As the other components, for example, there may be mentioned a colorant other than those described above, a dispersant other than those described above, a penetrating agent, such as triethylene glycol monomethyl ether, triethylene glycol monobutyl ether, diethylene glycol monomethyl ether, 1,2-hexanediol, 1,2-pentanediol, 1,2-butanediol, or 3-methyl-1,5-pentanediol; a pH adjuster; a chelating agent, such as ethylenediaminetetraacetate (EDTA); an antiseptic agent/fungicide; and an antirust agent. As the antiseptic agent/fungicide, for example, a compound having an intramolecular isothiazolone ring structure may be preferably used.

The content of one of the other components (when a plurality of components is contained as the other components, the total of the contents thereof is to be used) is preferably 6 percent by mass or less and more preferably 4 percent by mass or less.

In particular, when the aqueous ink jet composition of the present disclosure contains a dispersant (another dispersant) other than that described above, the content of the dispersant (the another dispersant) is preferably 5 percent by mass or less and more preferably 3 percent by mass or less.

The surface tension of the aqueous ink jet composition at 20° C. is preferably 20 to 50 mN/m, more preferably 21 to 40 mN/m, and further preferably 23 to 30 mN/m.

Accordingly, for example, the clogging of a nozzle of an ejection apparatus by an ink jet method is more unlikely to occur, and the ejection stability of the aqueous ink jet composition is further improved. In addition, even when the clogging of a nozzle occurs, when the nozzle is capped (capping), the recovery can be further improved.

In addition, as the surface tension, a value measured by Wilhelmy method may be used. For the measurement of the surface tension, a surface tension meter (such as CBVP-7, manufactured by Kyowa Interface Science Co., Ltd.) may be used.

The viscosity of the aqueous ink jet composition at 20° C. is preferably 2 to 30 mPa·s, more preferably 3 to 20 mPa·s, and further preferably 4 to 10 mPa·s.

Accordingly, the ejection stability of the aqueous ink jet composition is further improved.

In addition, the viscosity can be measured at 20° C. in such a way that by the use of a viscoelastic tester (such as MCR-300 manufactured by Pysica), the shear rate is increased from 10 to 1,000 $s^-$, and a viscosity at a shear rate of 200 $s^-$ is read.

In general, the aqueous ink jet composition of the present disclosure is, first, received in a container, such as a cartridge, a bag, or a tank, and is then applied to a recording apparatus by an ink jet method. In other words, a recording apparatus according to the present disclosure includes a container (such as an ink cartridge) receiving the aqueous ink jet composition of the present disclosure.

The aqueous ink jet composition of the present disclosure may be an ink to be ejected by an ink jet method or a raw liquid used for preparation of the ink, and although a concrete structure of an apparatus performing liquid droplet ejection is not particularly limited, the aqueous ink jet composition (including the raw liquid) of the present disclosure is preferably applied to an air-open type recording apparatus (in more particular, for example, an ink jet recording apparatus including an ink receiving container having an ink inlet through which an ink can be replenished and a recording head having at least one nozzle hole through which the ink is ejected).

According to the recording apparatus as described above, when an ink containing the specific yellow dye described above is used, there may be a problem in that when the ink is brought into contact with the air, in particular, foreign materials are liable to be generated at a gas-liquid interface; however, according to the present disclosure, even when the recording apparatus as described above is used, the problem as described above can be effectively prevented. That is, when the aqueous ink jet composition of the present disclosure is applied to an air-open type recording apparatus, the advantage of the present disclosure can be more significantly obtained.

Recording Method

The aqueous ink jet composition of the present disclosure may be applied to a direct printing method, a thermal transfer printing method (such as sublimation printing), or the like. In particular, even when the aqueous ink jet composition contains the sulfo group-containing coumarin skeleton compound, since the specific yellow dye which is a fluorescent dye has a sublimation property, and the sulfo group-containing coumarin skeleton compound which is a colorant component has substantially no sublimation property (in other words, the sublimation property thereof is sufficiently lower than that of the specific yellow dye), while the features of the specific yellow dye, such as excellent color tone and fluorescence intensity, are obtained, the color tone of a final recorded portion can be effectively prevented from being adversely influenced by the sulfo group-containing coumarin skeleton compound, and hence, the aqueous ink jet composition of the present disclosure can be preferably applied to a thermal transfer printing method.

Hereinafter, as a recording method using the aqueous ink jet composition of the present disclosure, one example of a thermal transfer printing method (sublimation printing) will be described.

A recording method according to the second embodiment includes an ink adhesion step of adhering an aqueous ink jet composition to an intermediate transfer medium by an ink jet method and a transfer step of transferring a specific yellow dye functioning as a sublimation dye contained in the aqueous ink jet composition to a recording medium by heating the intermediate transfer medium to which the aqueous ink jet composition is adhered.

Ink Adhesion Step

In the ink adhesion step, by an ink jet method, the aqueous ink jet composition is adhered to the intermediate transfer medium. Ejection of the aqueous ink jet composition by an ink jet method may be performed using a known ink jet recording apparatus. As an ejection method, a piezoelectric method, a method in which an ink is ejected by bubbles generated by heating the ink, and the like may be used. Among those methods, in particular, for example, since the aqueous ink jet composition is not likely to be degraded, a piezoelectric method is preferable.

In the ink adhesion step, an ink other than the aqueous ink jet composition according to the present disclosure may also be used together therewith.

Intermediate Transfer Medium

As the intermediate transfer medium, for example, paper, such as regular paper, or a recording medium on which an ink receiving layer is provided (which is called ink jet exclusive paper, coated paper, or the like) may be used. Among those mentioned above, paper provided with an ink receiving layer formed of inorganic particles, such as silica, is preferable. Accordingly, by a step of drying the aqueous ink jet composition adhered to the intermediate transfer medium, the intermediate transfer medium can be obtained so that, for example, bleeding is suppressed. In addition, in the subsequent transfer step, the sublimation of the specific yellow dye tends to be more smoothly carried out.

Transfer Step

Subsequently, the intermediate transfer medium to which the aqueous ink jet composition is adhered is heated, so that at least one specific yellow dye functioning as a constituent component of the aqueous ink jet composition is transferred to the recording medium. Accordingly, the recorded portion is obtained.

In particular, since the specific yellow dye functioning as a fluorescent dye has a sublimation property, and the sulfo group-containing coumarin skeleton compound functioning as a colorant component has substantially no sublimation property (in other words, the sublimation property is sufficiently lower than that of the specific yellow dye), even when the aqueous ink jet composition contains the sulfo group-containing coumarin skeleton compound, while the transfer of the sulfo group-containing coumarin skeleton compound to the recording medium is effectively prevented, the specific yellow dye can be transferred to the recording medium. Hence, in the recorded portion thus obtained, the features, such as excellent color tone and fluorescence intensity, of the specific yellow dye are obtained, and even when the aqueous ink jet composition contains the sulfo group-containing coumarin skeleton compound, the adverse influence caused by the color tone of the sulfo group-containing coumarin skeleton compound can be effectively prevented.

A heating temperature of this step is preferably 160° C. to 220° C. and more preferably 170° C. to 200° C.

Accordingly, the energy required for the transfer can be further decreased, and the productivity of the recorded portion can be further improved. In addition, for example, the chromogenic property of the obtained recorded portion can be further improved.

Although depending on the heating temperature, a heating time of this step is preferably 30 to 90 seconds and more preferably 45 to 80 seconds.

Accordingly, the energy required for the transfer can be further decreased, and the productivity of the recorded portion can be further improved. In addition, for example, the chromogenic property of the recorded portion thus obtained can be further improved.

In addition, although this step may be performed in such a way that heating is performed while the surface of the intermediate transfer medium to which the aqueous ink jet composition is adhered is placed to face the recording medium with a predetermined distance provided therebetween or while the surface of the intermediate transfer medium described above is in close contact with a surface of the recording medium, the heating is preferably performed while the surface of the intermediate transfer medium to which the aqueous ink jet composition is adhered is in close contact with the surface of the recording medium.

According, the energy required for the transfer can be further decreased, and the productivity of the recorded portion can be further improved. In addition, for example, the chromogenic property of the obtained recorded portion can be further improved.

Recording Medium

Although the recording medium is not particularly limited, for example, a cloth (such as a hydrophobic fiber cloth), a resin (plastic) film, paper, glass, a metal, and a ceramic may be mentioned. In addition, as the recording medium, a medium having a sheet shape or a steric shape, such as a sphere shape or a rectangular parallelepiped shape, may also be used.

When the recording medium is a cloth, as fibers forming the cloth, for example, there may be mentioned polyester fibers, nylon fibers, triacetate fibers, diacetate fibers, polyamide fibers, an a blended product formed from at least two types of the fibers mentioned above. In addition, there may also be used a blended product formed from the fibers mentioned above with regenerated fibers, such as rayon, or natural fibers, such as cotton, silk, and wool.

In addition, when the recording medium is a resin (plastic) film, as the resin (plastic) film, for example, there may be mentioned a polyester film, a polyurethane film, a polycarbonate film, a poly(phenylene sulfide) film, a polyimide film, and a poly(amide imide) film.

In addition, the resin (plastic) film may be either a laminated film formed by laminating a plurality of layers or a film formed of a gradient material in which the composition thereof is gradiently changed.

Heretofore, although the second embodiment of the present disclosure has been described, the present disclosure is not limited thereto.

For example, as the aqueous ink jet composition of the present disclosure, any composition which can be ejected by an ink jet method may be used, and the aqueous ink jet composition of the present disclosure may be not applied to the recording method as described above.

For example, the aqueous ink jet composition of the present disclosure may also be applied to a method including, besides the steps as described above, other steps (a pre-treatment step, an intermediate treatment step, and a post-treatment step).

In this case, as the pre-treatment step, for example, a step of applying a coating layer on the recording medium may be mentioned.

In addition, as the intermediate treatment step, for example, a step of performing pre-heating of the recording medium may be mentioned.

In addition, as the post-treatment step, for example, a step of washing the recording medium may be mentioned.

In addition, the aqueous ink jet composition of the present disclosure may also be preferably applied to sublimation transfer which uses no intermediate transfer medium. As the sublimation transfer using no intermediate transfer medium, for example, there may be mentioned a method including a step of adhering an aqueous ink jet composition by an ink jet method to a strippable ink receiving layer provided on a recording medium (such as a film product); a step of performing sublimation diffusion dyeing from the ink receiving layer to the recording medium located at a lower side by heating the recording medium provided with the ink receiving layer to which the aqueous ink jet composition is adhered; and a step of peeling the ink receiving layer from the recording medium to obtain a recorded portion.

EXAMPLES

Hereinafter, concrete examples of the present disclosure will be described.

[1] Preparation of Raw Liquid Used for Ink Jet Ink-Manufacturing (Aqueous Ink Jet Composition)

Example A21

First, C.I. Solvent Yellow 160: 1 and C.I. Disperse Yellow 82, each of which was a fluorescent dye functioning as a specific yellow dye, a formalin condensate of sodium naphthalene sulfonate functioning as a sulfonic acid-based dispersant, and purified water were mixed together at the rates shown in Table 5 and were then stirred at 3,000 rpm by a High Shear Mixer (manufactured by Silverson) to form a slurry. Subsequently, while being cooled with water, the slurry thus prepared was stirred and dispersed by a bead mill (LMZ015, manufactured by Ashizawa Finetech Ltd.) using glass beads having a diameter of 0.5 mm, so that as the aqueous ink jet composition, a raw liquid used for ink jet ink-manufacturing was manufactured.

The average particle diameter of the specific yellow dyes in the raw liquid used for ink jet ink-manufacturing was 150 nm.

Comparative Example A21

Except for that as the specific yellow dye, C.I. Solvent Yellow 160: 1 was only used, and the rates of the individual components were set as shown in Table 5, as the aqueous ink jet composition, a raw liquid used for ink jet ink-manufacturing was manufactured in a manner similar to that of Example A21.

The compositions and the like of the aqueous ink jet compositions (raw liquids used for ink jet ink-manufacturing) of Example A21 and Comparative Example A21 are shown in Table 5. In addition, in the table, C.I. Solvent Yellow 160: 1, C.I. Disperse Yellow 82, and the formalin condensate of sodium naphthalene sulfonate are represented by "SY160: 1", "DY82", and "C2-1", respectively. In addition, the raw liquids used for ink jet ink-manufacturing of the above Example and Comparative Example each had a viscosity in a range of 2.0 to 30 mPa·s, and the surface tensions thereof were each in a range of 25 to 50 mN/m. In addition, the viscosity was measured at 20° C. using a viscoelastic tester MCR-300 (manufactured by Pysica) in such a way that the shear rate was increased from 10 to 1,000 $s^-$, and a viscosity at a shear rate of 200 $s^-$ was read. In addition, the surface tension was measured at 20° C. by Wilhelmy method using a surface tension meter (CBVP-7, manufactured by Kyowa Interface Science Co., Ltd.).

TABLE 5

| | Blending Amount (Parts by Mass) | | | | | |
|---|---|---|---|---|---|---|
| | Specific Yellow Dye | Sulfonic Acid-Based Dispersant | Purified | | | |
| | SY160: 1 | DY82 | C2-1 | Water | X2/X1 | XS/XD |
| Example A21 | 12 | 3.0 | 15 | 70 | 0.25 | 1.0 |
| Comparative Example A21 | 15 | — | 15 | 70 | — | 1.0 |

[2] Evaluation of Raw Liquid Used for Ink Jet Ink-Manufacturing

[2-1] Storage Stability (Change in Particle Diameter)

The average particle diameter of the specific yellow dye of each of the aqueous ink jet compositions (raw liquids used for ink jet ink-manufacturing) of the above Example and Comparative Example immediately after the manufacturing thereof and the average particle diameter of the specific yellow dye thereof after the aqueous ink jet composition received in a predetermined container was left in an atmosphere at 60° C. for one week were obtained, and from the values thus obtained, the rate of change in average particle diameter of the specific yellow dye after the aqueous ink jet composition was left in an atmosphere at 60° C. for one week with respect to the average particle diameter of the specific yellow dye immediately after the manufacturing thereof was obtained, and evaluation was performed in accordance with the following criteria. In addition, for the measurement of the average particle diameter, a Microtrac UPA (manufactured by Nikkiso Co., Ltd.) was used. As the rate of change in average particle diameter is increased, the storage stability is regarded to be degraded.

A: The rate of change in average particle diameter is less than 5%.

B: The rate of change in average particle diameter is 5% to less than 10%.

C: The rate of change in average particle diameter is 10% to less than 15%.

D: The rate of change in average particle diameter is 15% to less than 20%.

E: The rate of change in average particle diameter is 20% or more.

Those results are collectively shown in Table 6.

TABLE 6

| | Storage Stability (Change in Particle Diameter) |
|---|---|
| Example A21 | A |
| Comparative Example A21 | E |

As apparent from Table 6, an excellent result could be obtained from Example A21 of the present disclosure. On the other hand, from Comparative Example A21, a satisfactory result could not be obtained.

[3] Preparation of Ink Jet Ink (Aqueous Ink Jet Composition)

Example B21

After the raw liquid used for ink jet ink-manufacturing prepared in Example A21, glycerin, propylene glycol, BYK348 (manufactured by BYK Japan KK) functioning as the silicone-based surfactant, and purified water were mixed together at the rates shown in Table 7, stirring was performed at 3,000 rpm by a High Shear Mixer (manufactured by Silverson), so that an ink jet ink functioning as the aqueous ink jet composition was manufactured.

The average particle diameter of the specific yellow dyes in the ink jet ink was 150 nm.

Example B22

First, C.I. Solvent Yellow 160: 1 and C.I. Disperse Yellow 82, each of which was a fluorescent dye functioning as the specific yellow dye, a styrene-sodium styrene sulfonate copolymer functioning as the sulfonic acid-based dispersant, glycerin, propylene glycol, BYK348 (manufactured by BYK Japan KK) functioning as the silicone-based surfactant, and purified water were mixed together at the rates shown in Table 7 and were then stirred at 3,000 rpm by a High Shear Mixer (manufactured by Silverson) to form a slurry. Subsequently, while being cooled with water, the slurry thus prepared was stirred and dispersed by a bead mill (LMZ015, manufactured by Ashizawa Finetech Ltd.) using glass beads having a diameter of 0.5 mm, so that as the aqueous ink jet composition, an ink jet ink was manufactured.

The average particle diameter of the specific yellow dyes in the ink jet ink was 150 nm.

Examples B23 to B28

Except for that the types of specific yellow dyes and sulfonic acid-based dispersant and the rates of those components were set as shown in Table 5, an ink jet ink functioning as the aqueous ink jet composition was manufactured in a manner similar to that of the above Example B22.

Comparative Example B21

After the raw liquid used for ink jet ink-manufacturing prepared in the above Comparative Example A21, glycerin, propylene glycol, BYK348 (manufactured by BYK Japan KK) functioning as the silicone-based surfactant, and purified water were mixed together at the rates shown in Table 7, stirring was performed at 3,000 rpm by a High Shear Mixer (manufactured by Silverson), so that an ink jet ink functioning as the aqueous ink jet composition was manufactured. That is, the ink jet ink of this Comparative Example contained only one type of specific yellow dye.

The average particle diameter of the specific yellow dye in the ink jet ink was 150 nm.

Comparative Example B22

First, C.I. Solvent Yellow 160: 1 and C.I. Disperse Yellow 82, each of which was a fluorescent dye functioning as the specific yellow dye, glycerin, propylene glycol, BYK348 (manufactured by BYK Japan KK) functioning as the silicone-based surfactant, and purified water were mixed together at the rates shown in Table 7 and were then stirred at 3,000 rpm by a High Shear Mixer (manufactured by Silverson) to form a slurry. Subsequently, while being cooled with water, the slurry thus prepared was stirred and dispersed by a bead mill (LMZ015, manufactured by Ashizawa Finetech Ltd.) using glass beads having a diameter of 0.5 mm, so that as the aqueous ink jet composition, an ink jet ink was manufactured. That is, the ink jet ink of this Comparative Example contained no sulfonic acid-based dispersant.

The average particle diameter of the specific yellow dyes in the ink jet ink was 150 nm.

Comparative Examples B23 to B26

Except for that the types of components used for preparation of the ink jet ink and the rates thereof were set as shown in Table 7, an ink jet ink functioning as the aqueous ink jet composition was manufactured in a manner similar to that of the above Example B22.

Conditions of the aqueous ink jet compositions (ink jet inks) of the above Examples and Comparative Examples are collectively shown in Table 7. In addition, in the table, C.I. Solvent Yellow 160: 1 is represented by "SY160: 1", C.I. Disperse Yellow 82 is represented by "DY82", C.I. Disperse Yellow 184 is represented by "DY184", the formalin condensate of sodium naphthalene sulfonate is represented by "C2-1", the sodium lignin sulfonate is represented by "C2-2", the styrene-sodium styrene sulfonate copolymer is represented by "C2-3", glycerin is represented by "Gly", propylene glycol is represented by "PG", BYK348 (manufactured by BYK Japan KK) functioning as the silicone-based surfactant is represented by "BYK348", C.I. Disperse Yellow 54 functioning as another component is represented by "DY54", and a styrene-sodium acrylate copolymer functioning as another component is represented by "C2'". In addition, the ink jet inks of the above examples B21 to B28 each had a viscosity in a range of 2.0 to 5.0 mPa·s, and the surface tensions thereof were each in a range of 20 to 35 mN/m. In addition, the viscosity was measured at 20° C. using a viscoelastic tester MCR-300 (manufactured by Pysica) in such a way that the shear rate was increased from 10 to 1,000 s⁻ and a viscosity at a shear rate of 200 s⁻ was read. In addition, the surface tension was measured at 20° C. by Wilhelmy method using a surface tension meter (CBVP-7, manufactured by Kyowa Interface Science Co., Ltd.).

TABLE 7

| | Specific Yellow Dye | | | Sulfonic Acid-Based Dispersant | | | Solvent Other than Water | | Surfactant | Other Components | | Purified | | |
|---|---|---|---|---|---|---|---|---|---|---|---|---|---|---|
| | SY160:1 | DY82 | DY184 | C2-1 | C2-2 | C2-3 | Gly | PG | BYK348 | DY54 | C2' | Water | X2/X1 | XS/XD |
| Example B21 | 4.0 | 1.0 | 0 | 5.0 | 0 | 0 | 15 | 10 | 0.5 | 0 | 0 | 64.5 | 0.25 | 1.0 |
| Example B22 | 5.0 | 0.1 | 0 | 5.0 | 0 | 0 | 15 | 10 | 0.5 | 0 | 0 | 64.4 | 0.02 | 0.98 |
| Example B23 | 4.0 | 0 | 2.0 | 0 | 0 | 5.0 | 15 | 10 | 0.5 | 0 | 0 | 63.5 | 0.5 | 0.83 |
| Example B24 | 5.0 | 0.05 | 0 | 5.0 | 0 | 0 | 15 | 10 | 0.5 | 0 | 0 | 64.45 | 0.01 | 0.99 |
| Example B25 | 5.0 | 0 | 0.01 | 0 | 0 | 5.0 | 15 | 10 | 0.5 | 0 | 0 | 64.49 | 0.002 | 1.0 |
| Example B26 | 2.5 | 0 | 2.5 | 0 | 5.0 | 0 | 15 | 10 | 0.5 | 0 | 0 | 64.5 | 1.0 | 1.0 |
| Example B27 | 1.0 | 0 | 4.0 | 0 | 5.0 | 0 | 15 | 10 | 0.5 | 0 | 0 | 64.5 | 0.25 | 1.0 |
| Example B28 | 4.0 | 0.5 | 0.5 | 4.0 | 0.5 | 0.5 | 15 | 10 | 0.5 | 0 | 0 | 65 | 0.125 | 1.0 |
| Comparative Example B21 | 5.0 | 0 | 0 | 5.0 | 0 | 0 | 15 | 10 | 0.5 | 0 | 0 | 64.5 | — | 1.0 |
| Comparative Example B22 | 4.0 | 1.0 | 0 | 0 | 0 | 0 | 15 | 10 | 0.5 | 0 | 0 | 69.5 | 0.25 | — |
| Comparative Example B23 | 0 | 0 | 0 | 5.0 | 0 | 0 | 15 | 10 | 0.5 | 5.0 | 0 | 64.5 | — | — |
| Comparative Example B24 | 4.0 | 1.0 | 0 | 0 | 0 | 0 | 15 | 10 | 0.5 | 0 | 5.0 | 64.5 | 0.25 | — |
| Comparative Example B25 | 5.0 | 0 | 0 | 0 | 0 | 0 | 15 | 10 | 0.5 | 0 | 5.0 | 64.5 | — | — |
| Comparative Example B26 | 4.0 | 0 | 0 | 5.0 | 0 | 0 | 15 | 10 | 0.5 | 0 | 1.0 | 64.5 | — | 1.25 |

[4] Evaluation of Ink Jet Ink
[4-1] Storage Stability (Change in Particle Diameter)

The average particle diameter of the dye of each of the aqueous ink jet compositions (ink jet inks) of the above Examples and Comparative Examples immediately after the manufacturing thereof and the average particle diameter of the dye thereof after the aqueous ink jet composition received in a predetermined ink container was left in an atmosphere at 60° C. for one week were obtained, and from the values thus obtained, the rate of change in average particle diameter of the dye after the aqueous ink jet composition was left in an atmosphere at 60° C. for one week with respect to the average particle diameter of the dye immediately after the manufacturing thereof was obtained, and evaluation was performed in accordance with the following criteria. In addition, for the measurement of the average particle diameter, a Microtrac UPA (manufactured by Nikkiso Co., Ltd.) was used. As the rate of change in average particle diameter is increased, the storage stability is regarded to be degraded.

A: The rate of change in average particle diameter is less than 5%.
B: The rate of change in average particle diameter is 5% to less than 10%.
C: The rate of change in average particle diameter is 10% to less than 15%.
D: The rate of change in average particle diameter is 15% to less than 20%.
E: The rate of change in average particle diameter is 20% or more.

[4-2] Clogging Recovery

After the aqueous ink jet composition (ink jet ink) of each of the above Examples and Comparative Examples was filled in a predetermined ink receiving container, the receiving container described above was mounted in a recording apparatus PX-H6000 (manufactured by Seiko Epson Corporation). In addition, the ink receiving container (the ink receiving container described above) of PX-H6000 manufactured by Seiko Epson Corporation has an ink inlet through which the aqueous ink jet composition can be replenished, and when being fitted to the recording apparatus so as to be ready to use, the container described above is opened to the air.

After all the nozzles were confirmed to normally eject the aqueous ink jet composition, the power source was put off when the recording apparatus was under the normal conditions, and the recording apparatus was left in an atmosphere at 40° C. for one month.

Subsequently, a recovery operation was repeatedly performed by suction until the normal ejection was obtained, and by the use of the number of recovery operations thus performed, evaluation was performed in accordance with the following criteria.

A: Normal ejection was performed immediately after the power source is put on. Alternatively, normal ejection was obtained when the number of recovery operations was one to three.

B: Normal ejection was obtained when the number of recovery operations was four to six.
C: Normal ejection was obtained when the number of recovery operations was seven to nine.
D: After the recovery operation was performed 9 times, the recording apparatus was left at room temperature for 12 hours, and after the recovery operation was further performed one to three times, normal ejection was obtained.
E: After the recovery operation was performed 9 times, the recording apparatus was left at room temperature for 12 hours, and although the recovery operation was further performed one to three times, normal ejection was not obtained.

[4-3] Chromogenic Property (Fluorescence Intensity)

After the aqueous ink jet composition (ink jet ink) of each of the above Examples and Comparative Examples was filled in a predetermined ink receiving container, the receiving container was mounted in a recording apparatus PX-H6000 (manufactured by Seiko Epson Corporation).

After all the nozzles were confirmed to normally eject the aqueous ink jet composition, the ink jet ink was ejected to TRANSJET Classic (manufactured by Cham Paper) functioning as the intermediate transfer medium to adhere a pattern having an ejection amount of 10% at a recording resolution of 1,440 by 720 dpi. In addition, the operation environment of the recording apparatus (printer) was set at 25° C.

Subsequently, one side of the intermediate transfer medium to which the aqueous ink jet composition was adhered was placed in close contact with a cloth (100% of a polyester, Amina, manufactured by Toray Industries, Inc.) which was a white recording medium, and under the conditions described above, sublimation transfer was performed by heating at 200° C. for 60 seconds using a heat press machine (TP-608M, manufactured by Taiyoseiki Co., Ltd.), so that a recorded portion was obtained.

Evaluation of the fluorescence intensity of each recorded portion thus obtained was performed. In particular, by the use of a spectrophotometer FD-7 (manufactured by Konica Minolta, Inc.), after a fluorescent brightening intensity of a pattern having an ink ejection amount of 10% on the cloth, which was the recorded portion, was measured three times, the average value was obtained therefrom and was then evaluated in accordance with the following criteria. In addition, the measurement conditions are as described below.

Measurement method: reflection measurement
Lighting conditions: M1 [D50]
Density white reference: absolute value
Observation field: 2°
Observation light source: D50
Polarizing filter: not mounted
A: The fluorescent brightening intensity is 4 or more.
B: The fluorescent brightening intensity is 3 to less than 4.
C: The fluorescent brightening intensity is 2 to less than 3.
D: The fluorescent brightening intensity is 1 to less than 2.
E: The fluorescent brightening intensity is less than 1.

Those results are collectively shown in Table 8.

TABLE 8

| | Storage Stability (Change in Particle Diameter) | Clogging Recovery | Chromogenic Property (Fluorescence Intensity) |
|---|---|---|---|
| Example B21 | A | A | A |
| Example B22 | A | A | A |
| Example B23 | A | A | A |
| Example B24 | B | A | A |
| Example B25 | C | B | A |
| Example B26 | B | A | B |
| Example B27 | B | B | C |
| Example B28 | A | A | A |
| Comparative Example B21 | E | E | A |
| Comparative Example B22 | E | E | A |
| Comparative Example B23 | A | A | E |
| Comparative Example B24 | C | E | A |
| Comparative Example B25 | D | E | A |
| Comparative Example B26 | E | D | A |

As apparent from Table 8, excellent results could be obtained from Examples of the present disclosure. On the other hand, satisfactory results could not be obtained from Comparative Examples.

What is claimed is:

1. An aqueous ink jet composition comprising:
a first component which is at least one selected from the group consisting of C.I. Solvent Yellow 160: 1, C.I. Disperse Yellow 82, and C.I. Disperse Yellow 184;
a second component which is a dispersant having at least one chemical structure of a sulfo group and a salt thereof; and
a third component which has a coumarin skeleton and at least one chemical structure of a sulfo group and a salt thereof,
wherein among the dye forming the specific yellow dye group, C.I. Solvent Yellow 160: 1 is a component having a highest content,
the content of C.I. Solvent Yellow 160: 1 with respect to the entire specific yellow dye group is 60.0 to 99.0 percent by mass, and
the content of C.I. Solvent Yellow 160: 1 in the aqueous ink jet composition is 0.5 to 25.0 percent by mass.

2. The aqueous ink jet composition according to claim 1, wherein the second component is at least one selected from the group consisting of a formalin condensate of sodium naphthalene sulfonate, sodium lignin sulfonate, and a styrene-sodium styrene sulfonate copolymer.

3. The aqueous ink jet composition according to claim 1, wherein the third component is at least one selected from the group consisting of C.I. Acid Yellow 184 and C.I. Acid Yellow 250.

4. The aqueous ink jet composition according to claim 1, wherein $0.2 \leq X2/X1 \leq 5.0$, wherein the content of the first component and the content of the second component are represented by X1 percent by mass and X2 percent by mass, respectively.

5. The aqueous ink jet composition according to claim 1, wherein $0.001 \leq X3/X1 \leq 3.0$, wherein the content of the first component and the content of the third component are represented by X1 percent by mass and X3 percent by mass, respectively.

6. The aqueous ink jet composition according to claim 1, wherein $0.001 \leq X3/X2 \leq 3.0$, wherein the content of the second component and the content of the third component are represented by X2 percent by mass and X3 percent by mass, respectively.

7. The aqueous ink jet composition according to claim 1, wherein the content of the first component is 0.5 to 20 percent by mass.

8. The aqueous ink jet composition according to claim 1, wherein the content of the second component is 0.5 to 20 percent by mass.

9. The aqueous ink jet composition according to claim 1, wherein the content of the third component is 0.005 to 6.0 percent by mass.

10. An aqueous ink jet composition comprising:
- at least two types of dye components selected from a specific yellow dye group consisting of C.I. Solvent Yellow 160: 1, C.I. Disperse Yellow 82, and C.I. Disperse Yellow 184; and
- a sulfonic acid-based dispersant which is a dispersant having at least one chemical structure of a sulfo group and a salt thereof,
- wherein among the dye components forming the specific yellow dye group, C.I. Solvent Yellow 160: 1 is a component having a highest content,
- the content of C.I. Solvent Yellow 160: 1 with respect to the entire specific yellow dye group is 60.0 to 99.0 percent by mass, and
- the content of C.I. Solvent Yellow 150: 1 in the aqueous ink jet composition is 0.5 to 25.0 percent by mass.

11. The aqueous ink jet composition according to claim 10, wherein when one component having a highest content among the dye components forming the specific yellow dye group is regarded as a first dye component, the content of the first dye component with respect to the entire specific yellow dye group is 50.0 to 99.9 percent by mass.

12. The aqueous ink jet composition according to claim 10, wherein $0.001 \leq X2/X1 \leq 1.0$, wherein one component having a highest content among the dye components forming the specific yellow dye group is regarded as a first dye component, another and different component among the dye components forming the specific yellow dye group, the content of which is the same as or second to the content of the first dye component, is regarded as a second dye component, the content of the first dye component in the aqueous ink jet composition is represented by X1 percent by mass, and the content of the second dye component in the aqueous ink jet composition is represented by X2 percent by mass.

13. The aqueous ink jet composition according to claim 10, wherein among the dye components forming the specific yellow dye group, C.I. Solvent Yellow 160: 1 is a component having a highest content.

14. The aqueous ink jet composition according to claim 10, wherein the sulfonic acid-based dispersant is at least one selected from the group consisting of a formalin condensate of sodium naphthalene sulfonate, sodium lignin sulfonate, and a styrene-sodium styrene sulfonate copolymer.

15. The aqueous ink jet composition according to claim 10, wherein $0.2 \leq XS/XD \leq 5.0$, wherein a content of the specific yellow dye group and the content of the sulfonic acid-based dispersant are represented by XD percent by mass and XS percent by mass, respectively.

16. The aqueous ink jet composition according to claim 10, wherein a content of the specific yellow dye group is 0.6 to 26 percent by mass.

17. The aqueous ink jet composition according to claim 10, wherein the content of the sulfonic acid-based dispersant is 0.5 to 20 percent by mass.

* * * * *